(12) United States Patent
Yang et al.

(10) Patent No.: US 12,487,793 B2
(45) Date of Patent: Dec. 2, 2025

(54) AUDIO PLAYBACK METHOD, FAILURE DETECTION METHOD FOR SCREEN SOUND PRODUCTION COMPONENT, AND ELECTRONIC DEVICE

(71) Applicant: Beijing Honor Device Co., Ltd., Beijing (CN)

(72) Inventors: Xiao Yang, Beijing (CN); Jianfeng Xu, Beijing (CN); Zhiqiang Qiu, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 30 days.

(21) Appl. No.: 18/270,650

(22) PCT Filed: May 18, 2022

(86) PCT No.: PCT/CN2022/093638
§ 371 (c)(1),
(2) Date: Jun. 30, 2023

(87) PCT Pub. No.: WO2023/000795
PCT Pub. Date: Jan. 26, 2023

(65) Prior Publication Data
US 2024/0069862 A1    Feb. 29, 2024

(30) Foreign Application Priority Data

Jul. 23, 2021 (CN) .......................... 202110839831.8
Sep. 17, 2021 (CN) .......................... 202111094726.2

(51) Int. Cl.
*G06F 3/16* (2006.01)
*H04R 29/00* (2006.01)

(52) U.S. Cl.
CPC .......... *G06F 3/167* (2013.01); *H04R 29/004* (2013.01); *H04R 2499/11* (2013.01)

(58) Field of Classification Search
CPC ..... B06B 1/0253; G06F 1/1688; G06F 3/165; G06F 3/167; G06F 3/04883;
(Continued)

(56) References Cited

U.S. PATENT DOCUMENTS 8,326,328 B2 * 12/2012 LeBeau .................. G10L 15/26
455/418
8,374,872 B2 * 2/2013 Kesireddy .............. G10L 15/22
704/235
(Continued)

FOREIGN PATENT DOCUMENTS

CN      202406292 U       8/2012
CN      106878908 A       6/2017
(Continued)

*Primary Examiner* — Gerald Gauthier
(74) *Attorney, Agent, or Firm* — WOMBLE BOND DICKINSON (US) LLP

(57) ABSTRACT

An audio playback method, a failure detection method for a screen sound production component, and an electronic device. The audio playback method includes: receiving an audio playback instruction; where the audio playback instruction is used to instruct the electronic device to play a first audio; playing, in response to receiving the audio playback instruction, a detection audio by using the screen sound production component; obtaining a first parameter in a process of playing the detection audio; determining, based on the first parameter, whether the screen sound production component fails; where the first parameter is at least one of a real-time load current, a real-time load voltage, a real-time impedance, and a real-time admittance of the screen sound production component; and when the screen sound production component fails, switching the sound production component to the speaker, and playing the first audio by using the speaker.

20 Claims, 23 Drawing Sheets

(58) Field of Classification Search
CPC ........... G06F 16/24556; G06F 16/9535; G06F
40/216; G06F 40/40; G06Q 30/0641;
G06Q 30/0255; G10L 25/51; G10L
15/22; G10L 15/26; G10L 17/00; G10L
21/0208; G10L 21/18; H04M 1/72403;
H04M 1/72469; H04M 1/24; H04M
1/271; H04M 3/4938; H04R 3/12; H04R
29/001; H04R 29/004; H04R 2499/11;
H04R 1/02; H04R 1/023; H04R 1/08;
H04R 1/44; H04R 1/46; H04R 17/005;
G01C 21/3608; G01M 7/00; G06T
19/006; G11B 27/34; G16H 40/67; H04L
12/2816; H04N 23/695; H04S 7/304;
H04W 12/06
See application file for complete search history.

(56) References Cited

U.S. PATENT DOCUMENTS

| | | | | |
|---|---|---|---|---|
| 8,433,580 | B2* | 4/2013 | Sugiyama | G06F 40/40 704/7 |
| 8,543,397 | B1* | 9/2013 | Nguyen | G06F 3/04883 704/235 |
| 8,639,516 | B2* | 1/2014 | Lindahl | G10L 21/0208 704/275 |
| 8,699,944 | B2* | 4/2014 | Malamud | H04W 12/06 455/39 |
| 8,798,995 | B1* | 8/2014 | Edara | G06Q 30/0255 704/211 |
| 8,938,394 | B1* | 1/2015 | Faaborg | G10L 15/22 704/274 |
| 8,953,889 | B1* | 2/2015 | Worley, III | G06F 16/24556 455/457 |
| 9,026,914 | B1* | 5/2015 | Kauffmann | H04S 7/304 704/275 |
| 10,819,305 | B2 | 10/2020 | Qin et al. | |
| 11,620,999 | B2* | 4/2023 | Dighe | G10L 15/22 704/275 |
| 11,636,859 | B2* | 4/2023 | Boekweg | G10L 21/18 704/275 |
| 11,656,837 | B2* | 5/2023 | Lee | G10L 25/51 704/275 |
| 11,657,813 | B2* | 5/2023 | Peterson | G10L 17/00 704/275 |
| 11,676,610 | B2* | 6/2023 | Zhang | G10L 15/22 704/275 |
| 11,700,139 | B2* | 7/2023 | Drake | H04L 12/2816 704/275 |
| 11,710,482 | B2* | 7/2023 | Garcia | G10L 15/22 704/275 |
| 11,721,320 | B2* | 8/2023 | Park | G06F 3/167 704/275 |
| 11,721,332 | B1* | 8/2023 | Mokady | G06Q 30/0641 704/275 |
| 11,762,627 | B2* | 9/2023 | Hansson | H04N 23/695 704/275 |
| 11,769,497 | B2* | 9/2023 | Manjunath | H04M 1/72469 704/275 |
| 11,782,676 | B2* | 10/2023 | Shah | H04R 1/46 704/275 |
| 2004/0176958 | A1* | 9/2004 | Salmenkaita | H04M 3/4938 704/275 |
| 2008/0262847 | A1* | 10/2008 | Agapi | G10L 15/26 340/407.1 |
| 2010/0121636 | A1* | 5/2010 | Burke | H04R 1/08 704/E15.04 |
| 2011/0014952 | A1* | 1/2011 | Minton | H04M 1/271 715/728 |
| 2011/0153332 | A1* | 6/2011 | Hu | H04M 1/24 704/E21.001 |
| 2011/0157420 | A1* | 6/2011 | Bos | G11B 27/34 704/E11.001 |
| 2012/0134518 | A1* | 5/2012 | Otani | H04R 1/023 381/189 |
| 2012/0237076 | A1* | 9/2012 | Kuze | H04R 7/20 381/387 |
| 2012/0260177 | A1* | 10/2012 | Sehrer | G06F 3/167 704/E21.001 |
| 2013/0080178 | A1* | 3/2013 | Kang | G06F 3/167 704/E21.001 |
| 2013/0185078 | A1* | 7/2013 | Tzirkel-Hancock | G10L 15/22 704/E11.001 |
| 2014/0095173 | A1* | 4/2014 | Lynch | G06F 3/167 704/275 |
| 2014/0195252 | A1* | 7/2014 | Gruber | G10L 15/22 704/275 |
| 2014/0278442 | A1* | 9/2014 | Hong | G01C 21/3608 704/275 |
| 2015/0084902 | A1 | 3/2015 | Atsumi et al. | |
| 2015/0117682 | A1* | 4/2015 | Fukami | B06B 1/0253 381/190 |
| 2015/0154976 | A1* | 6/2015 | Mutagi | G06F 3/167 704/275 |
| 2015/0169284 | A1* | 6/2015 | Quast | G06F 16/9535 704/275 |
| 2015/0170672 | A1* | 6/2015 | Liu | G06F 3/167 704/275 |
| 2015/0228281 | A1* | 8/2015 | Raniere | G10L 15/22 704/275 |
| 2015/0302854 | A1* | 10/2015 | Clough | G16H 40/67 704/275 |
| 2015/0370531 | A1* | 12/2015 | Faaborg | G06F 3/167 704/275 |
| 2016/0205469 | A1* | 7/2016 | Steijner | H04R 1/44 381/334 |
| 2017/0092001 | A1* | 3/2017 | Anderson | G06T 19/006 |
| 2020/0348902 | A1* | 11/2020 | Park | H04R 3/12 |
| 2021/0089270 | A1* | 3/2021 | Lv | H04M 1/72403 |
| 2022/0247847 | A1* | 8/2022 | Chen | H04R 17/005 |
| 2022/0400338 | A1* | 12/2022 | Silver | H04R 1/02 |
| 2022/0417648 | A1* | 12/2022 | Yang | H04R 1/02 |
| 2023/0085959 | A1* | 3/2023 | Gharpure | G06F 3/167 704/275 |
| 2023/0098174 | A1* | 3/2023 | Simes | G06F 40/216 704/275 |
| 2023/0297327 | A1* | 9/2023 | Pasko | G06F 3/167 704/275 |
| 2024/0069862 | A1* | 2/2024 | Yang | H04R 29/001 |

FOREIGN PATENT DOCUMENTS

| | | | | |
|---|---|---|---|---|
| CN | 108616797 | A | 10/2018 | |
| CN | 109032556 | A * | 12/2018 | ........... G06F 1/1637 |
| CN | 109086022 | A | 12/2018 | |
| CN | 109240413 | A | 1/2019 | |
| CN | 109361797 | A | 2/2019 | |
| CN | 110018808 | A | 7/2019 | |
| CN | 110191221 | A | 8/2019 | |
| CN | 110868683 | A | 3/2020 | |
| CN | 112047734 | A | 12/2020 | |
| KR | 20030069255 | A | 8/2003 | |
| KR | 102183339 | B1 | 11/2020 | |

* cited by examiner (a)

(b)

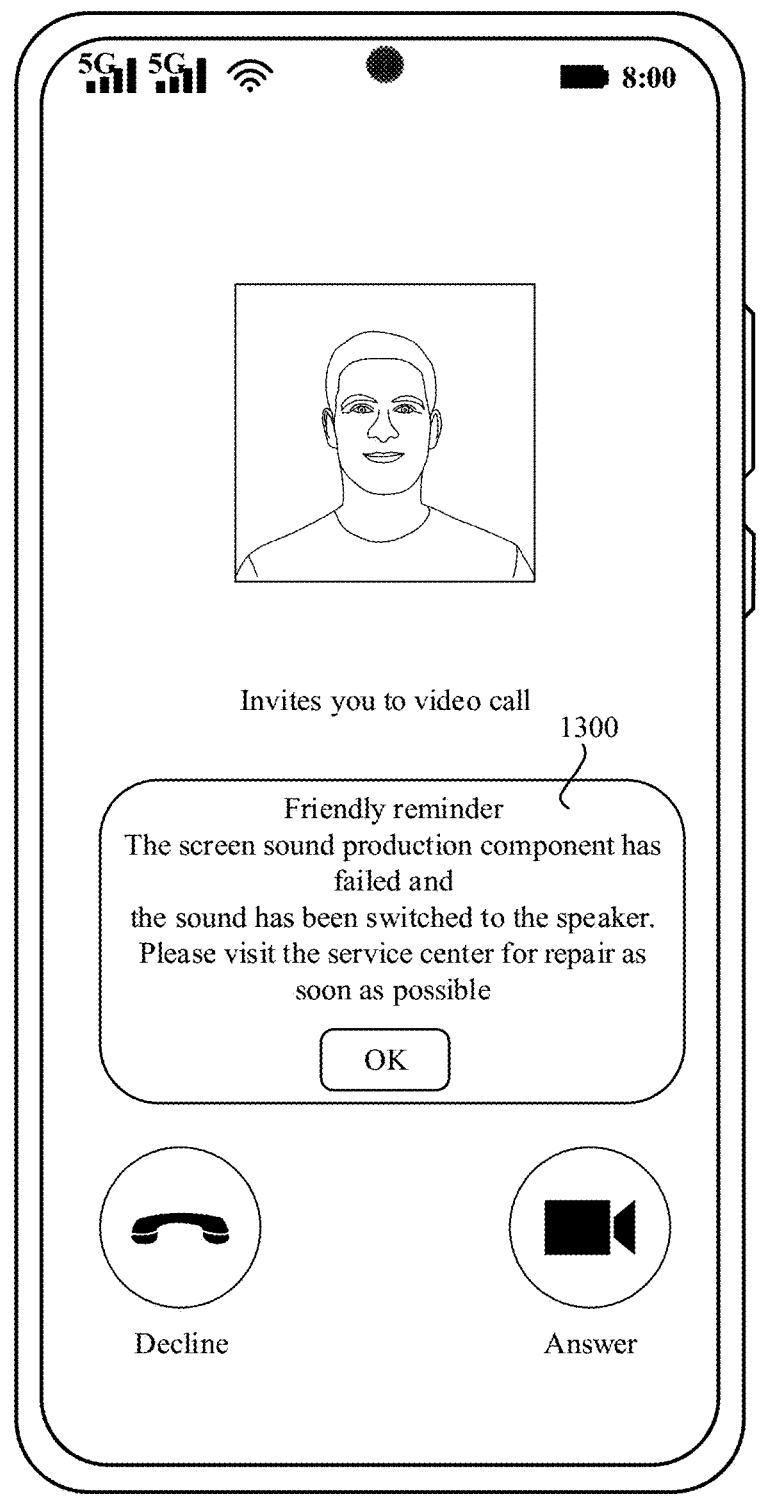
FIG. 13B(1)

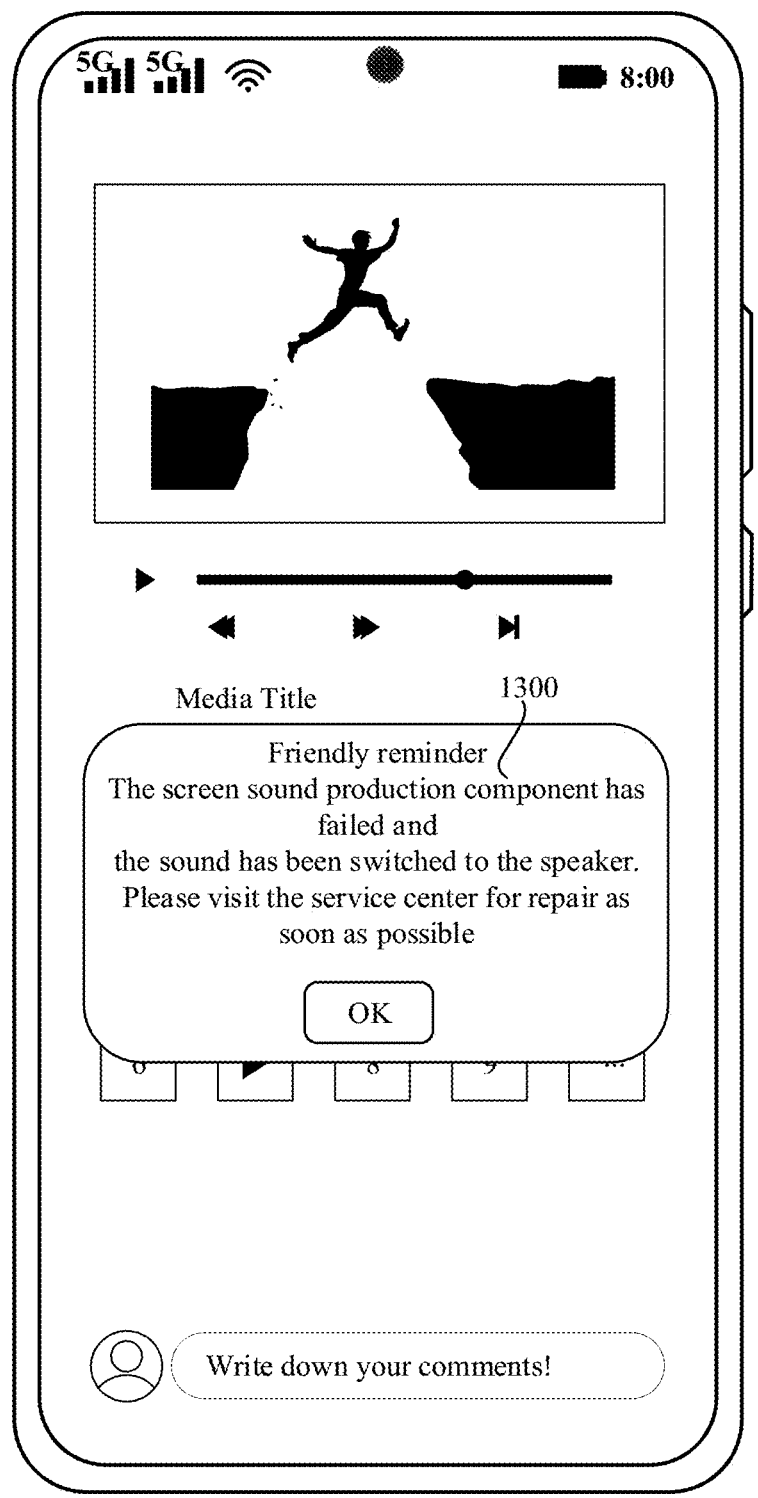
FIG. 13B(2)

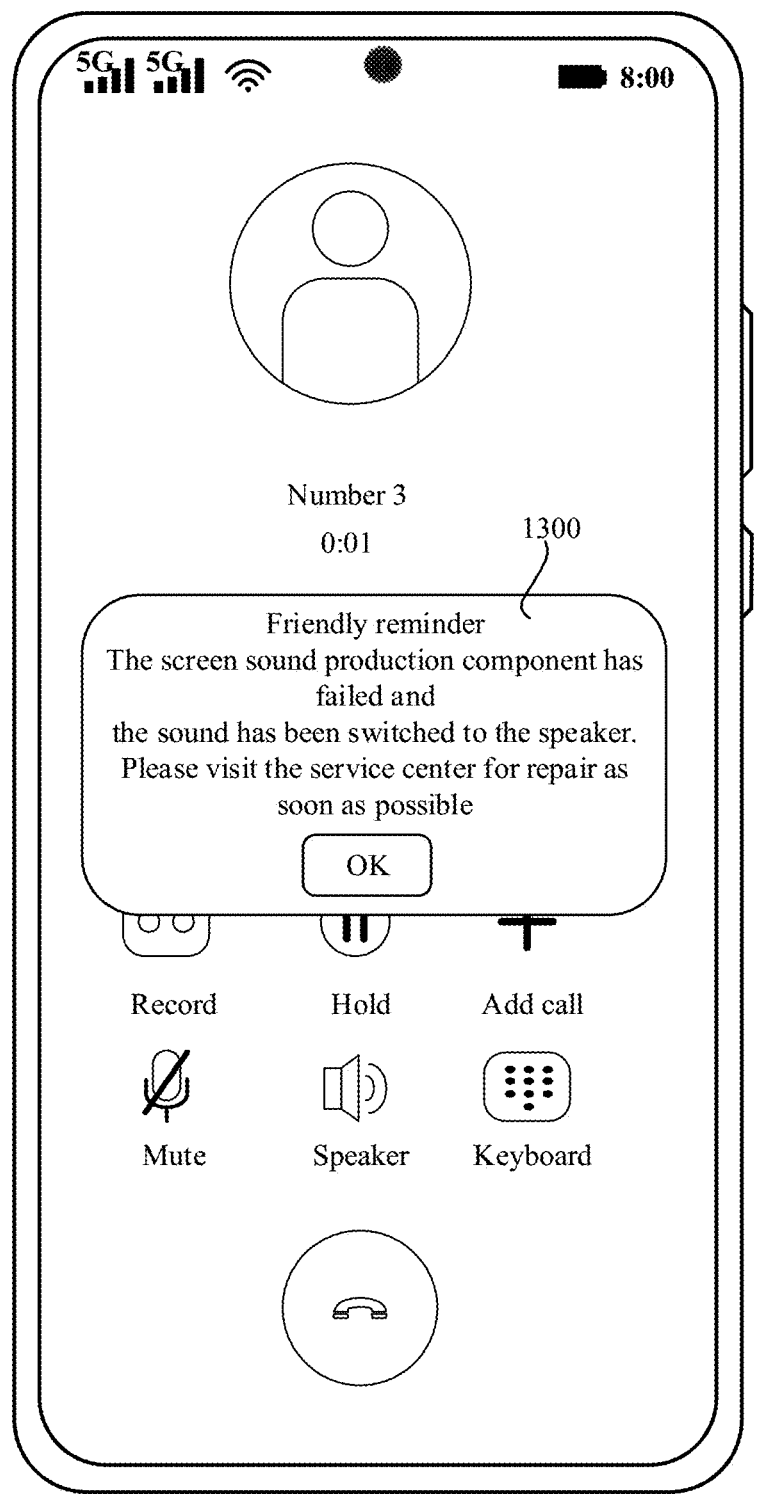
FIG. 13B(3)

AUDIO PLAYBACK METHOD, FAILURE DETECTION METHOD FOR SCREEN SOUND PRODUCTION COMPONENT, AND ELECTRONIC DEVICE

CROSS-REFERENCE TO RELATED APPLICATIONS

This application is a national stage of International Application No. PCT/CN2022/093638, filed on May 18, 2022, which claims priority to Chinese Patent Application No. 202110839831.8, filed on Jul. 23, 2021, and Chinese Patent Application No. 202111094726.2, filed on Sep. 17, 2021. The disclosures of each of the aforementioned applications are hereby incorporated by reference in their entireties.

TECHNICAL FIELD

This application relates to the field of electronic technologies, and in particular, to an audio playback method, a failure detection method for a screen sound production component, and an electronic device.

BACKGROUND

Currently, a large quantity of electronic devices have a voice communication function, such as a mobile phone or a tablet. To implement the voice communication function, a sound production component needs to be installed in the electronic device to enable a user to hear voice of the other party. With a requirement of the electronic device on a screen-to-body ratio of a screen, a hole in a front panel (that is, the screen) of the electronic device needs to be reduced. Therefore, a screen sound production component (such as a piezoelectric ceramic capacitive component) is generally disposed in the electronic device as a speaker (such as an earpiece).

In a use process of the electronic device, the piezoelectric ceramic capacitive component may fail (for example, breaking or electrode falling off). After the piezoelectric ceramic capacitive component fails, the electronic device may produce sound or noise during voice communication, which affects user experience.

SUMMARY

Embodiments of this application provide an audio playback method, a failure detection method for a screen sound production component, and an electronic device to resolve a problem of silence or noise that occurs after the screen sound production component fails, thereby improving reliability of the electronic device and user experience.

To achieve the foregoing objective, the following technical solutions are used in this application:

According to a first aspect, this application provides an audio playback method. The audio playback method is applied to an electronic device, and the electronic device includes a screen sound production component and a speaker. The audio playback method includes: receiving an audio playback instruction; where the audio playback instruction is used to instruct the electronic device to play a first audio; playing, in response to receiving the audio playback instruction, a detection audio by using the screen sound production component; obtaining a first parameter in a process of playing the detection audio; determining, based on the first parameter, whether the screen sound production component fails; where the first parameter is at least one of a real-time load current, a real-time load voltage, a real-time impedance, and a real-time admittance of the screen sound production component; and when the screen sound production component fails, switching the sound production component to the speaker, and playing the first audio; or when the screen sound production component does not fail, playing the first audio by using the screen sound production component, or playing the first audio simultaneously by using the screen sound production component and the speaker.

Based on the foregoing audio playback method, the detection audio is played by using the screen sound production component before or in a process of playing the audio. In the process of playing the detection audio, the first parameter is obtained, and it may be determined, based on the first parameter, whether the screen sound production component fails (for example, breaking or electrode falling off). When it is determined that the screen sound production component fails, the sound production component is switched, such as switching to the speaker for sound production. In this way, a noise or silence problem that occurs when the screen sound production component fails can be avoided, reliability of the electronic device can be improved, and user experience can be improved.

In a possible implementation, the detection audio is a second audio; the second audio is an audio signal different from the first audio; and the playing, in response to receiving the audio playback instruction, a detection audio by using the screen sound production component includes: playing the second audio by using the screen sound production component before playing the first audio in response to receiving the audio playback instruction.

That is, before the first audio is played as instructed by the electronic device, the second audio that is inaudible to a human ear, or an audio signal that is audible to the human ear and that is specially used to detect whether a screen fails may be played first, so as to detect whether the screen sound production component fails. In this way, power consumption generated when the electronic device detects, in real time, whether the screen sound production component fails may be reduced.

In a possible implementation, the detection audio is the first audio; and the obtaining a first parameter in a process of playing the detection audio includes: obtaining the first parameter according to a preset period in the process of playing the detection audio. The preset period is used to indicate a time interval between two times of determining whether the screen sound production component fails. When the first audio is used as the detection audio, the electronic device may detect in real time whether the screen sound production component fails (for example, at an interval of 1 second). In this way, the electronic device may detect a failure of the screen sound production component in the audio playback process, so as to improve reliability of the electronic device.

In a possible implementation, if a battery level of the electronic device is greater than a preset threshold, the detection audio is the first audio; and the obtaining a first parameter in a process of playing the detection audio includes: obtaining the first parameter according to a preset period in the process of playing the detection audio. The preset period is used to indicate a time interval between two times of determining whether the screen sound production component fails. Alternatively, if a battery level of the electronic device is less than or equal to a preset threshold, the detection audio is a second audio; the second audio is an audio signal different from the first audio; and the playing, in response to receiving the audio playback instruction, a detection audio by using the screen sound production component includes: playing the second audio by using the screen sound production component before playing the first audio in response to receiving the audio playback instruction.

In this way, an occasion of detecting the screen sound production component may be selected by using the battery level of the electronic device. When the battery level is greater than the preset threshold, the first audio is used as the detection audio for detecting whether the screen sound production component fails, so as to detect, in real time, whether the screen sound production component fails, so as to avoid that a sudden failure of the screen sound production component in the audio playback process cannot be detected, thereby improving reliability of the electronic device. When the battery level is less than or equal to the preset threshold, the second audio that is not audible to the human ear is used as the detection audio for detecting whether the screen sound production component fails, and before the first audio is played, it is detected whether the screen sound production component fails, so as to reduce power consumption of the electronic device.

In a possible implementation, the second audio includes a human-ear inaudible single-frequency audio signal or a human-ear audible audio signal different from the first audio.

In a possible implementation, the audio playback instruction includes a call instruction, a music playback instruction, or a video file playback instruction.

In a possible implementation, the first parameter includes the real-time load current of the screen sound production component; the determining, based on the first parameter, whether the screen sound production component fails includes: if the real-time load current of the screen sound production component is greater than a maximum value of a current threshold range, or the real-time load current of the screen sound production component is less than a minimum value of the current threshold range, determining that the screen sound production component fails; and the current threshold range is: a current range corresponding to a first frequency when the screen sound production component does not fail; and the first frequency is a frequency of a center frequency point of the detection audio. Generally, after the screen sound production component fails, the load current of the screen sound production component changes greatly. In this way, it may be determined, by using the real-time load current of the screen sound production component, whether the screen sound production component fails.

In a possible implementation, the first parameter includes the real-time load voltage of the screen sound production component; the determining, based on the first parameter, whether the screen sound production component fails includes: if the real-time load voltage of the screen sound production component is greater than a maximum value of a voltage threshold range, or the real-time load voltage of the screen sound production component is less than a minimum value of the voltage threshold range, determining that the screen sound production component fails; and the voltage threshold range is: a voltage range corresponding to the first frequency when the screen sound production component does not fail; and the first frequency is the frequency of the center frequency point of the detection audio. Generally, after the screen sound production component fails, the load voltage of the screen sound production component also changes greatly. In this way, it may be determined, by using the real-time load voltage of the screen sound production component, whether the screen sound production component fails.

In a possible implementation, the first parameter includes the real-time impedance of the screen sound production component; the real-time impedance of the screen sound production component is determined by the real-time load voltage and the real-time load current of the screen sound production component; the determining, based on the first parameter, whether the screen sound production component fails includes: if the real-time impedance of the screen sound production component is greater than a maximum value of an impedance threshold range, or the real-time impedance of the screen sound production component is less than a minimum value of the impedance threshold range, determining that the screen sound production component fails; and the impedance threshold range is: an impedance range corresponding to the first frequency when the screen sound production component does not fail; and the first frequency is the frequency of the center frequency point of the detection audio. It should be understood that a feedback voltage (that is, the real-time load voltage) and a feedback current (that is, the real-time load current) of the screen sound production component may be obtained from a smart PA hardware circuit, and the real-time impedance of the screen sound production component may be determined by using the feedback voltage and the feedback current. Generally, after the screen sound production component fails, the impedance of the screen sound production component changes greatly. In this way, it may be determined, by using the real-time impedance of the screen sound production component, whether the screen sound production component fails.

In a possible implementation, the first parameter includes: the real-time admittance of the screen sound production component; the real-time admittance of the screen sound production component is determined by the real-time load voltage and the real-time load current of the screen sound production component; the determining, based on the first parameter, whether the screen sound production component fails includes: if the real-time admittance of the screen sound production component is greater than a maximum value of an admittance threshold range, or the real-time admittance of the screen sound production component is less than a minimum value of the admittance threshold range, determining that the screen sound production component fails; and the admittance threshold range is: an admittance range corresponding to the first frequency when the screen sound production component does not fail; and the first frequency is the frequency of the center frequency point of the detection audio. It should be understood that a feedback voltage (that is, the real-time load voltage) and a feedback current (that is, the real-time load current) of the screen sound production component may be obtained from a smart PA hardware circuit, and the real-time admittance of the screen sound production component may also be determined by using the feedback voltage and the feedback current. Because the admittance of the screen sound production component is a reciprocal of the impedance of the screen sound production component, when the impedance of the screen sound production component changes greatly, the admittance of the screen sound production component also changes greatly. Therefore, it may be further determined, by using the real-time admittance of the screen sound production component, whether the screen sound production component fails.

In a possible implementation, the real-time load current of the screen sound production component is: an average value of M feedback currents obtained through detection when the screen sound production component plays N frames of the detection audio; and N and M are both positive integers greater than 1. For example, each time the screen sounding component plays one frame of detection audio, one feedback current value may be obtained, and in this case, N and M may be equal. In this solution, the real-time load current of the screen sound production component is an average value of a plurality of feedback currents, and an error caused by noise on a detection path may be reduced.

In a possible implementation, the real-time load voltage of the screen sound production component is: an average value of M feedback voltages obtained through detection when the screen sound production component plays N frames of the detection audio; and N and M are both positive integers greater than 1. Similarly, in this solution, the real-time load voltage of the screen sound production component is an average value of a plurality of feedback voltages, and an error caused by noise on a detection path may also be reduced.

In a possible implementation, the real-time load voltage of the screen sound production component or the real-time load current of the screen sound production component is obtained by a smart power amplifier module.

In a possible implementation, the method may further include: displaying a preset prompt box when the screen sound production component fails; where the preset prompt box includes prompt information; and the prompt information is used to indicate that the screen sound production component has failed. In this way, when the screen sound production component fails, the electronic device prompts, in a timely manner, the user that the screen sound production component fails, thereby improving user experience.

In a possible implementation, the method may further include: when the screen sound production component fails, turning off the screen sound production component. In this way, power consumption of the electronic device can be reduced, and noise occurring when the screen sound production component fails can be avoided.

According to a second aspect, this application provides a failure detection method for a screen sound production component. The method is applied to an electronic device, and the electronic device includes a screen sound production component. The failure detection method for a screen sound production component includes: playing a detection audio by using the screen sound production component in response to a preset operation or based on a preset time point; where the preset operation or the preset time point is used to trigger the electronic device to detect whether the screen sound production component fails; obtaining a first parameter in a process of playing the detection audio; and determining, based on the first parameter, whether the screen sound production component fails; where the first parameter is at least one of a real-time load current, a real-time load voltage, a real-time impedance, and a real-time admittance of the screen sound production component.

Based on the failure detection method for a screen sound production component, the electronic device may detect, based on the preset operation or the preset time point, whether the screen sound production component fails, so as to periodically detect the screen sound production component, so as to notify the user of a failure of the screen sound production component in time, and prompt the user to repair or modify a default configuration of the electronic device, so as to improve reliability of the electronic device.

In a possible implementation, the first parameter includes the real-time load current of the screen sound production component; the determining, based on the first parameter, whether the screen sound production component fails includes: if the real-time load current of the screen sound production component is greater than a maximum value of a current threshold range, or the real-time load current of the screen sound production component is less than a minimum value of the current threshold range, determining that the screen sound production component fails; and the current threshold range is: a current range corresponding to a first frequency when the screen sound production component does not fail; and the first frequency is a frequency of a center frequency point of the detection audio.

In a possible implementation, the first parameter includes the real-time load voltage of the screen sound production component; the determining, based on the first parameter, whether the screen sound production component fails includes: if the real-time load voltage of the screen sound production component is greater than a maximum value of a voltage threshold range, or the real-time load voltage of the screen sound production component is less than a minimum value of the voltage threshold range, determining that the screen sound production component fails; and the voltage threshold range is: a voltage range corresponding to the first frequency when the screen sound production component does not fail; and the first frequency is the frequency of the center frequency point of the detection audio.

In a possible implementation, the first parameter includes the real-time impedance of the screen sound production component; the real-time impedance of the screen sound production component is determined by the real-time load voltage and the real-time load current of the screen sound production component; the determining, based on the first parameter, whether the screen sound production component fails includes: if the real-time impedance of the screen sound production component is greater than a maximum value of an impedance threshold range, or the real-time impedance of the screen sound production component is less than a minimum value of the impedance threshold range, determining that the screen sound production component fails; and the impedance threshold range is: an impedance range corresponding to the first frequency when the screen sound production component does not fail; and the first frequency is the frequency of the center frequency point of the detection audio.

In a possible implementation, the first parameter includes: the real-time admittance of the screen sound production component; the real-time admittance of the screen sound production component is determined by the real-time load voltage and the real-time load current of the screen sound production component; the determining, based on the first parameter, whether the screen sound production component fails includes: if the real-time admittance of the screen sound production component is greater than a maximum value of an admittance threshold range, or the real-time admittance of the screen sound production component is less than a minimum value of the admittance threshold range, determining that the screen sound production component fails; and the admittance threshold range is: an admittance range corresponding to the first frequency when the screen sound production component does not fail; and the first frequency is the frequency of the center frequency point of the detection audio.

In a possible implementation, the real-time load current of the screen sound production component is: an average value of M feedback currents obtained through detection when the screen sound production component plays N frames of the detection audio; and N and M are both positive integers greater than 1.

In a possible implementation, the real-time load voltage of the screen sound production component is: an average value of M feedback voltages obtained through detection when the screen sound production component plays N frames of the detection audio; and N and M are both positive integers greater than 1.

In a possible implementation, the real-time load voltage of the screen sound production component or the real-time load current of the screen sound production component is obtained by a smart power amplifier module.

It should be understood that for technical effects in the foregoing possible implementations, references may be made to technical effects in a related part of the first aspect, and details are not described herein again.

According to a third aspect, this application provides an electronic device. The electronic device includes a screen sound production component; a speaker; one or more processors; a memory; and a communication module; where both the screen sound production component and the speaker are configured to play a sound signal of the electronic device; the communication module is configured to communicate with an external device; and the memory stores one or more computer programs, and the one or more computer programs include instructions; and when the instructions are executed by the processor, the electronic device is enabled to perform the method according to any one of the possible implementations of the first aspect or the second aspect.

According to a fourth aspect, an embodiment of this application provides a chip system, where the chip system includes one or more interface circuits and one or more processors. The interface circuit and the processor are interconnected by using a line. The chip system may be applied to an electronic device including a communication module and a memory. The interface circuit may read instructions stored in the memory of the electronic device, and send the instructions to the processor. When the instructions are executed by the processor, the electronic device may be enabled to perform the method according to any one of the possible implementations of the first aspect or the second aspect.

According to a fifth aspect, an embodiment of this application provides a computer-readable storage medium. The computer-readable storage medium stores instructions. When the instructions run on an electronic device, the electronic device is enabled to perform the method according to any one of the possible implementations of the first aspect or the second aspect.

According to a sixth aspect, an embodiment of this application provides a computer program product. When the computer program product runs on a computer, the computer is enabled to perform the method according to any one of the possible implementations of the first aspect or the second aspect.

It may be understood that for beneficial effects that can be achieved by the foregoing provided electronic device according to the third aspect, the chip system according to the fourth aspect, the computer-readable storage medium according to the fifth aspect, and the computer program product according to the sixth aspect, references may be made to the beneficial effects in the corresponding methods provided in the first aspect or the second aspect, and details are not described herein again.

BRIEF DESCRIPTION OF DRAWINGS

FIG. 13B(1) to FIG. 13B(3) are a scenario diagram of an audio playback method according to an embodiment of this application;

DESCRIPTION OF EMBODIMENTS

Figure 1A:
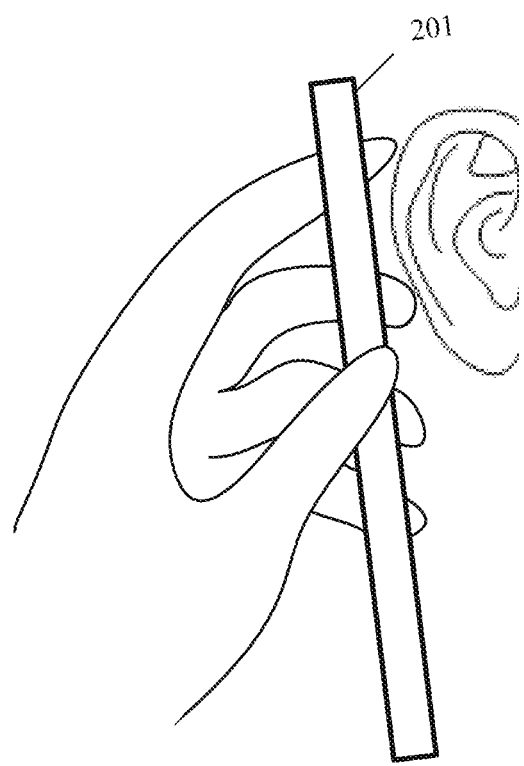
FIG. 1A is a schematic diagram of a scenario in which a user performs voice communication by using an electronic device according to an embodiment of this application.

Technical solutions in embodiments of this application are described below with reference to the accompanying drawings in the embodiments of this application. In the description of this application, unless otherwise specified, "at least one" means one or more, and "plurality" means two or more. In addition, for ease of clearly describing the technical solutions in the embodiments of this application, in the embodiments of this application, words such as "first" and "second" are used to distinguish same items or similar items whose functions and effects are basically the same. A person skilled in the art may understand that the terms "first", "second", and the like, and do not limit a quantity and an execution order, and the terms "first", "second", and the like are not limited to be necessarily different.

Currently, a large quantity of electronic devices have a voice communication function or an audio playback function. To implement the voice communication function, a sound production component needs to be installed in the electronic device to enable a user to hear voice of the other party during voice communication. Similarly, to implement the audio playback function, the electronic device also needs to install a sound production component. Using an example in which an electronic device such as a mobile phone implements a voice communication function, an earpiece (also referred to as a speaker) is disposed on a top of the mobile phone as a sound production component used for voice communication, so as to implement the voice communication function. Generally, the earpiece is disposed inside the mobile phone, and a sound outlet needs to be formed on a front panel of the mobile phone. When the earpiece produces a sound, sound energy produced by the earpiece can be transmitted through the sound outlet, so that a user can hear the sound produced by the earpiece. However, with continuous development of the mobile phone, to provide the user with better screen viewing experience, a screen-to-body ratio of a screen of the mobile phone is increasingly high. Because the sound outlet disposed on the front panel occupies a partial region of the front panel of the mobile phone, a width of a frame of the mobile phone is increased, which affects the increase of the screen-to-body ratio of the mobile phone.

With development of large-screen and full-screen mobile phones, to increase the screen-to-body ratio of the mobile phone, an area occupied by the sound outlet of the earpiece on the front panel of the mobile phone needs to be reduced. For example, the sound outlet of the earpiece of the mobile phone is designed as a long seam shape, and the sound outlet is located at a joint (also referred to as a mobile phone side seam) between the middle frame of the mobile phone and the front panel. In some cases, to ensure a good sound output effect of the sound outlet of the earpiece of the mobile phone, a hole at a top of the middle frame of the mobile phone may also be used as a sound outlet. In this case, when the user uses the mobile phone to perform voice communication, the auricle of the user cannot completely cover and wrap the sound outlet, and the sound energy of the earpiece of the mobile phone cannot be completely transmitted to the auricle of the user, thereby generating a sound leakage phenomenon.

For example, the mobile phone is used as an example. In a process in which the user holds the mobile phone to perform voice communication by using the earpiece, the earpiece of the mobile phone is configured to play a sound signal of a peer user in a voice communication process (that is, the earpiece of the mobile phone is the foregoing speaker used to make a voice call in voice communication). As shown in FIG. 1A, a sound outlet 201 of the earpiece of the mobile phone is close to the ear (or the auricle) of the user. In this case, because the sound outlet 201 of the earpiece of the mobile phone (for example, a sound outlet at the side seam of the mobile phone and a sound outlet at the top of the middle frame) cannot be completely covered and wrapped by the ear of the user, a sound signal sent by the sound outlet 201 can not only be heard by the user, but also heard by another user in a quiet environment, thereby generating a sound leakage phenomenon.

Figure 1B:
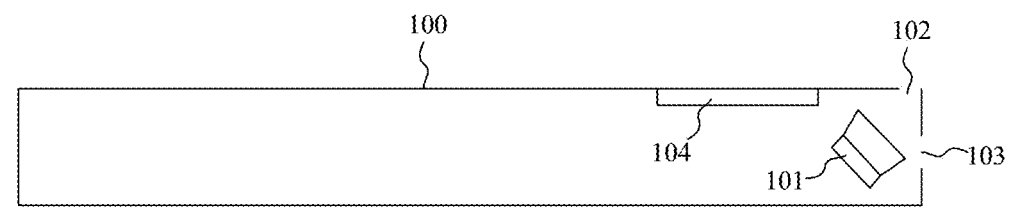
FIG. 1B is a schematic diagram of a structure of an electronic device according to an embodiment of this application.
Figure 1B:
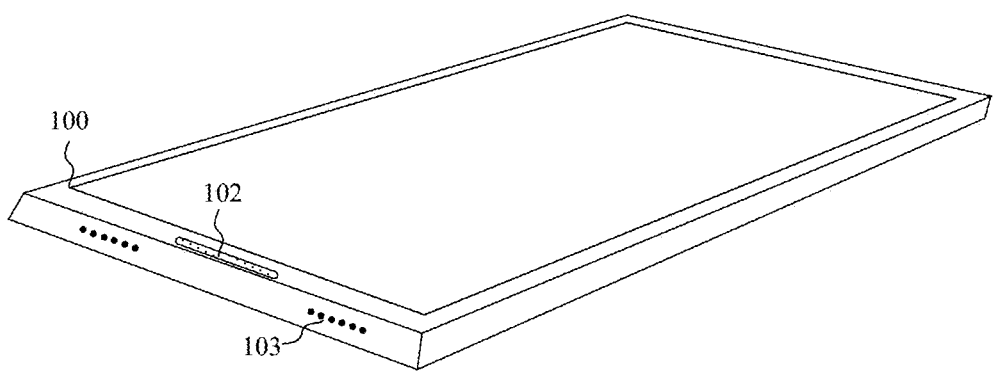

To avoid the sound leakage phenomenon during sound production of the earpiece, some electronic devices use screen sound production instead of earpiece sound production, or use both screen sound production and earpiece sound production. For example, FIG. 1B is a schematic diagram of a structure of an electronic device. The electronic device includes a housing structure 100. The housing structure 100 is enclosed by a front panel (including a screen and a frame), a rear panel configured to support an internal circuit, and a middle frame. As shown in (a) in FIG. 1B, an earpiece 101 and a screen sound production component 104 are disposed in the housing structure 100 of the electronic device. The earpiece 101, also referred to as a receiver, is a speaker used to make a voice call in voice communication, and is generally disposed at a top location of the housing structure. The screen sound production component 104 may be a vibration source connected to a lower part of a screen. With reference to (b) in FIG. 1B, corresponding to the earpiece 101, the electronic device is disposed with two sound outlets, which are respectively a sound outlet 102 and a sound outlet 103. The sound outlet 102 is at a location (that is, a location of a side seam) at which the front panel and the middle frame of the electronic device are connected. The sound outlet 103 is at a location that is on the middle frame of the electronic device and that is close to the earpiece (that is, a top location of the middle frame of the electronic device). In this way, the electronic device shown in FIG. 1B can produce a sound by using the earpiece, or produce a sound by using the screen, or produce a sound by using the earpiece and the screen, so as to avoid a sound leakage phenomenon when only the earpiece produces a sound.

It should be understood that specific structures of the screen sound production component in the electronic device are different for different screen sound production solutions. For example, the screen sound production component may be a vibration source (such as a piezoelectric ceramic, a motor vibrator, an exciter, or another vibration unit) connected to the back of the screen. The vibration source may vibrate under control of a current signal, so as to drive the screen to vibrate, thereby implementing screen sound production. For another example, the screen sound production component may be a piezoelectric ceramic that is fixed to the middle frame of the electronic device by using a cantilever structure. The piezoelectric ceramic may vibrate under control of a current signal, and transmit the vibration to the screen by using the middle frame of the mobile phone, so as to drive the screen to vibrate, thereby implementing screen sound production. For another example, the screen sound production component may alternatively be an exciter fixed to the middle frame of the electronic device. The exciter may vibrate under control of a current signal, and transmit the vibration to the screen by using the middle frame of the mobile phone, so as to drive the screen to vibrate, thereby implementing screen sound production. For another example, the screen sound production component may alternatively be split magnetic levitation oscillators. One of the split magnetic levitation oscillators is fixed to the middle frame of the electronic device, and the other oscillator is fixed to the screen. The oscillator that can be fixed to the screen vibrates relative to the oscillator that is fixed to the middle frame of the electronic device and under control of a current signal, so as to push the screen to vibrate, so as to implement screen sound production.

Figure 2:
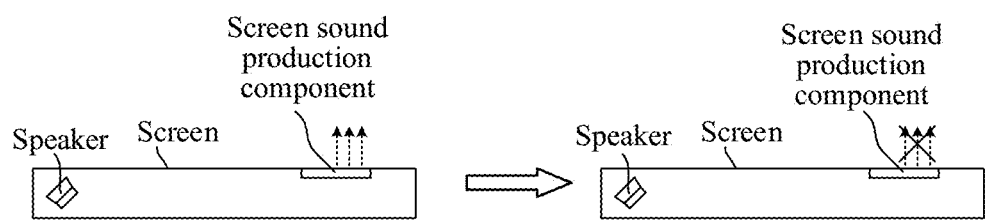
FIG. 2 is a schematic diagram of comparison before and after a screen sound production component fails according to an embodiment of this application.

However, as shown in FIG. 2, an electronic device (such as a mobile phone) that uses a screen sound production component can send a normal sound signal when the screen sound production component is normal. As the electronic device is used for a long time, the screen sound production component (such as a piezoelectric ceramic) may fail (such as breaking or depolarization), thereby causing a problem that the screen sound production component is silent or noise occurs. Consequently, the electronic device cannot play a sound signal (such as voice communication or music playback) normally, thereby affecting user experience.

To resolve the foregoing problem, an embodiment of this application provides an audio playback method. In the audio playback method, before or in an audio playback process, it is detected whether a screen sound production component fails (such as breaking or electrode falling off), and the sound production component is switched, for example, to a speaker when the screen sound production component fails, thereby avoiding a noise or silence problem that occurs when the screen sound production component fails, thereby improving user experience.

The following describes the audio playback method provided in this embodiment of this application with reference to the accompanying drawings.

For example, the electronic device in the embodiments of this application may be a device that has a voice communication function, such as a mobile phone, a tablet computer, an ultra-mobile personal computer (ultra-mobile personal computer, UMPC), a netbook, a cellular phone, a personal digital assistant (personal digital assistant, PDA), or a wearable device (such as a smartwatch or a smart band). A specific form of the electronic device is not specifically limited in the embodiments of this application.

Figure 3:
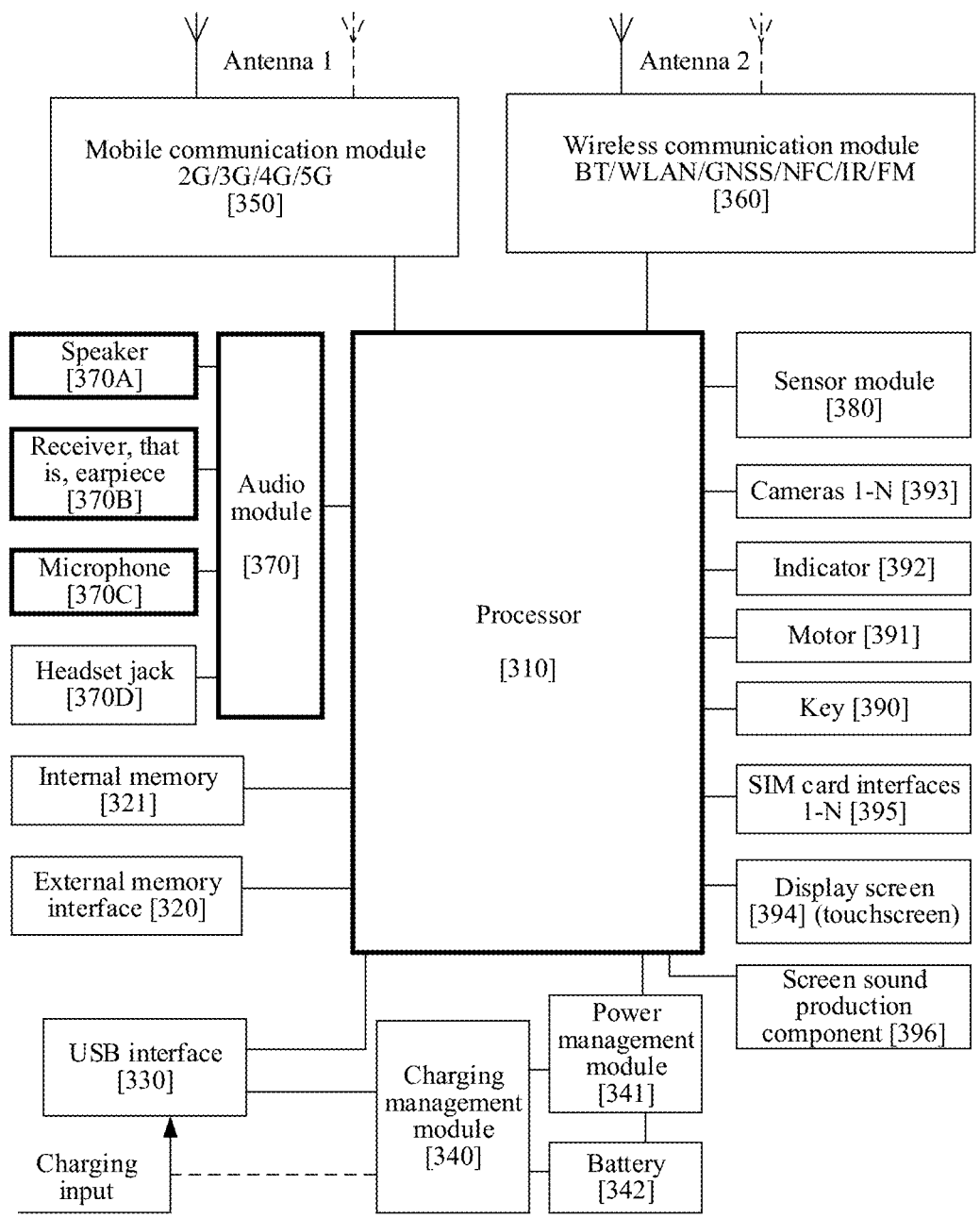
FIG. 3 is a schematic diagram of a structure of another electronic device according to an embodiment of this application.

For example, the electronic device is a mobile phone. FIG. 3 is a schematic diagram of a structure of another electronic device according to an embodiment of this application. In other words, for example, the electronic device shown in FIG. 3 may be a mobile phone.

As shown in FIG. 3, the mobile phone may include: a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a receiver (that is, an earpiece) 370B, a microphone 370C, a headset jack 370D, a sensor module 380, a key 390, a motor 391, an indicator 392, a camera 393, a display screen 394, a subscriber identity module (subscriber identification module, SIM) card interface 395, a screen sound production component 396, and the like.

The sensor module may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure illustrated in this embodiment does not constitute a specific limitation on the mobile phone. In some other embodiments, the mobile phone may include more or fewer components than those shown in the figure, or some components may be combined, or some components may be split, or components are arranged in different manners. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and command center of the mobile phone. The controller may generate an operation control signal based on an instruction operation code and a time sequence signal, so as to complete control over instruction fetching and instruction execution.

The DSP may include a smart power amplifier (smart PA) hardware circuit, a smart PA algorithm module, and an audio algorithm module. The smart PA hardware circuit may be separately connected to the application processor and the screen sound production component (such as a piezoelectric ceramic), and is configured to control the screen sound production component to produce a sound according to an instruction of the application processor. It should be understood that, generally, the smart PA hardware circuit may be further configured to: in a process of playing an audio by the screen sound production component, detect a feedback current and a feedback voltage of the screen sound production component, and calculate an impedance or an admittance of the screen sound production component based on the feedback current and the feedback voltage of the screen sound production component. The admittance is a reciprocal of the impedance. The calculated impedance or admittance of the screen sound production component may be used to control a physical parameter (such as a temperature and an amplitude) of the screen sound production component (such as a piezoelectric ceramic).

In this embodiment of this application, the smart PA algorithm module is configured to determine, based on the feedback voltage and the feedback current of the screen sound production component (for example, a piezoelectric ceramic), or the impedance or the admittance of the screen sound production component that is obtained through calculation based on the feedback voltage and the feedback current, whether the screen sound production component (for example, a piezoelectric ceramic) fails (abnormal). The smart PA algorithm module is further configured to report a result when the screen sound production component (such as a piezoelectric ceramic) is abnormal, and report the result to the audio algorithm module. The audio algorithm module controls switching of the sound production component, such as switching the screen sound production component (such as a piezoelectric ceramic, that is, a capacitive component) to the speaker for sound production.

It should be understood that the smart PA hardware circuit may alternatively be disposed outside the DSP chip, which is not specifically limited in this embodiment of this application.

A memory may be further configured in the processor 310, to store instructions and data. In some embodiments, the memory in the processor 310 is a cache memory. The memory may store an instruction or data that is recently used or cyclically used by the processor 310. If the processor 310 needs to use the instruction or the data again, the processor 310 may directly invoke the instruction or the data from the memory, to avoid repeated access and reduce a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in this embodiment is merely an example for description and does not constitute a limitation on the structure of the mobile phone. In some other embodiments, the mobile phone may alternatively user an interface connection manner different from that in the foregoing embodiment, or user a combination of a plurality of interface connection manners.

In this embodiment of this application, the electronic device may determine, by using the processor 310, a category of a listening environment in which the electronic device is currently located; and then separately adjust, based on the category, a frequency band in which the earpiece produces a sound and a frequency band in which the screen produces a sound, to control the earpiece and the screen to produces a sound to respectively play sounds in corresponding frequency bands in a sound signal, so as to avoid sound leakage of the electronic device when a human ear listens to a sound in a quiet environment.

The charging management module 340 is configured to receive a charging input from a charger (such as a wireless charger or a wired charger) to charge the battery 342. The power management module 341 is configured to connect to the battery 342, the charging management module 340, and the processor 310. The power management module 341 receives an input of the battery 342 and/or an input of the charging management module 340, to supply power to the components in the electronic device.

A wireless communication function of the mobile phone may be implemented by using the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the mobile phone may be configured to cover one or more communication frequency bands. Different antennas may be multiplexed to improve antenna utilization. For example, the antenna 1 may be multiplexed as a diversity antenna of a wireless local area network. In some other embodiments, the antenna may be used in combination with a tuning switch.

In some embodiments, in the mobile phone, the antenna 1 is coupled to the mobile communication module 350, and the antenna 2 is coupled to the wireless communication module 360, so that the mobile phone can communicate with a network and another device by using a wireless communication technology. The mobile communication module 350 may provide a solution for wireless communication including 2G/3G/4G/5G and the like applied to the mobile phone. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering and amplification on the received electromagnetic wave, and transmit a processed electromagnetic wave to the modem processor for demodulation.

The mobile communication module 350 may further amplify a signal modulated by the modem processor, and convert the signal into an electromagnetic wave for radiation through the antenna 1. In some embodiments, at least some of functional modules of the mobile communication module 350 may be disposed in the processor 310. In some embodiments, at least some of the functional modules of the mobile communication module 350 may be disposed in a same device as at least some of modules of the processor 310.

The wireless communication module 360 may provide a solution for wireless communication including a wireless local area network (wireless local area network, WLAN) (such as a wireless fidelity (wireless fidelity, Wi-Fi) network), Bluetooth (blue tooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the mobile phone.

The wireless communication module 360 may be one or more devices that integrate at least one communication processing module. The wireless communication module 360 receives an electromagnetic wave through the antenna 2, modulates and filters an electromagnetic wave signal, and sends a processed signal to the processor 310. The wireless communication module 360 may also receive a to-be-sent signal from the processor 310, perform frequency modulation and amplification on the to-be-sent signal, and convert the signal into an electromagnetic wave for radiation through the antenna 2.

Certainly, the wireless communication module 360 may also support the mobile phone in performing voice communication. For example, the mobile phone may access a Wi-Fi network by using the wireless communication module 360, and then interact with another device by using any application program that can provide a voice communication service, to provide a user with the voice communication service. For example, the application program that can provide the voice communication service may be an instant messaging application.

The mobile phone may implement a display function by using the GPU, the display screen 394, the application processor, and the like. The GPU is a microprocessor for image processing, and is connected to the display screen 394 and the AP. The GPU is configured to perform mathematical and geometric calculation, and is configured to render graphics. The processor 310 may include one or more GPUs, and execute program instructions to generate or change display information. The display screen 394 is configured to display an image and a video.

The mobile phone can implement a photographing function by using the ISP, the camera 393, the video codec, the GPU, the display screen 394, the application processor, and the like. The ISP is configured to process data fed back by the camera 393. In some embodiments, the ISP may be arranged in the camera 393. The camera 393 is configured to capture a static image or a video. In some embodiments, the mobile phone may include one or N cameras 393, where N is a positive integer greater than 1.

The external memory interface 320 may be configured to connect to an external storage card such as a micro SD card, to extend a storage capability of the mobile phone. The internal memory 321 may be configured to store computer executable program code, and the executable program code includes instructions. The processor 310 runs the instruction stored in the internal memory 321, to perform various function applications and data processing of the mobile phone. For example, in this embodiment of this application, the processor 310 may perform the instructions stored in the internal memory 321, and the internal memory 321 may include a program storage area and a data storage area.

The mobile phone may implement an audio function, such as music playing or recording, by using the audio module 370, the speaker 370A, the receiver (that is, the earpiece) 370B, the microphone 370C, the headset jack 370D, the application processor, for example, music playing and sound recording.

The audio module 370 is configured to convert a digital audio signal into an analog audio signal for output, and is also configured to convert an analog audio input into a digital audio signal. The audio module 370 may be further configured to encode and decode an audio signal. In some embodiments, the audio module 370 may be configured in the processor 310, or some functional modules of the audio module 370 may be configured in the processor 310. The speaker 370A, also referred to as a "loudspeaker", is configured to convert an audio electrical signal into a sound signal. The receiver 370B, also referred to as an "earpiece", is configured to convert an audio electrical signal into a sound signal. The microphone 370C, also referred to as a "mike" or a "mic", is configured to convert a sound signal into an electrical signal. The headset jack 370D is configured to connect to a wired headset. The headset jack 370D may be the USB port 330, or may be a 3.5 mm open mobile terminal platform (open mobile terminal platform, OMTP) standard interface or a cellular telecommunications industry association of the USA (cellular telecommunications industry association of the USA, CTIA) standard interface.

The receiver 370B (that is, the "earpiece") may be the earpiece 101 shown in FIG. 1B.

For example, in this embodiment of this application, the audio module 370 may convert audio electrical signals received by the mobile communication module 350 and the wireless communication module 360 into sound signals. The receiver (that is, the "earpiece") 370B of the audio module 370 plays the sound signal, and the screen sound production component 396 drives the screen (that is, the display screen) to perform screen sound production to play the sound signal.

The key 390 includes a power key, a volume key, and the like. The motor 391 may generate a vibration prompt. The indicator 392 may be an indicator light, and may be configured to indicate a charging state or a battery change, or may be further configured to indicate a message, a missed call, a notification, or the like. The SIM card interface 395 is configured to connect to a SIM card. The mobile phone may support one or N SIM card interfaces, where N is a positive integer greater than 1.

Certainly, it may be understood that FIG. 3 is merely an example for description when a device form of the electronic device is a mobile phone. If the electronic device is in another device form such as a tablet computer, a handheld computer, a PDA, or a wearable device (for example, a smartwatch or a smart band), the structure of the electronic device may include fewer structures than those shown in FIG. 3 or may include more structures than those shown in FIG. 3. This is not limited herein.

The following uses an example in which the electronic device is a mobile phone to describe in detail the audio playback method provided in the embodiment of this application. As described above, in the audio playback method provided in the embodiment of this application, it is necessary to detect, before or during audio playback, whether the screen sound production component fails. Therefore, the following uses an example in which the screen sound production component is a piezoelectric ceramic to describe how to detect whether the screen sound production component fails.

Figure 4:
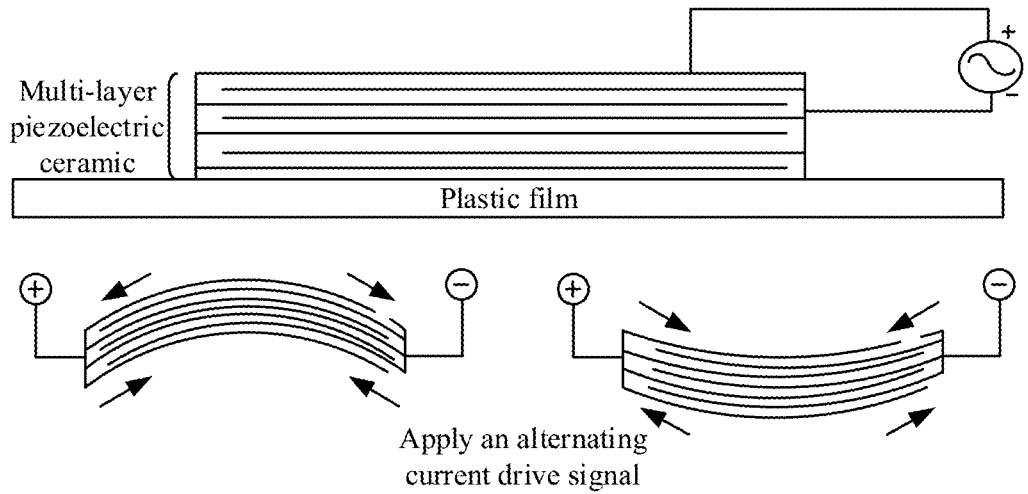
FIG. 4 is a schematic diagram of a screen sound production component according to an embodiment of this application.

FIG. 4 is a schematic diagram of a screen sound production component. The screen sound production component includes a multi-layer piezoelectric ceramic. The multi-layer piezoelectric ceramic forms a vibration film, and after an alternating current driving signal is applied, bending deformation can be performed to push the vibration film to produce a sound under a piezoelectric effect.

Figure 5:
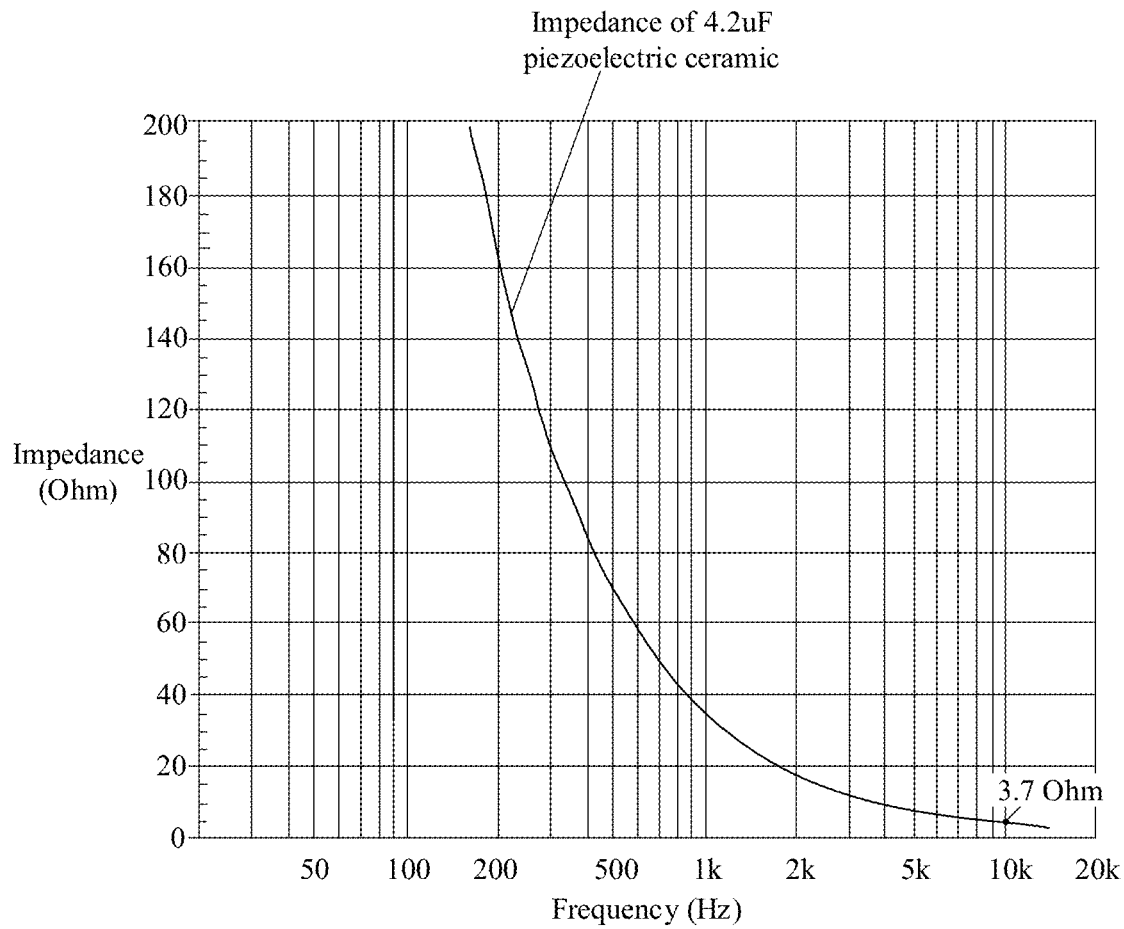
FIG. 5 is a graph of a frequency resistance characteristic of a 4.2-microfarad piezoelectric ceramic according to an embodiment of this application.

Generally, an impedance of the piezoelectric ceramic (that is, a capacitive component) meets the following relationship:

$$z = \frac{1}{2\pi f C},$$

where z is the impedance of the piezoelectric ceramic, C is a capacitance, and f is an alternating current signal frequency. It can be seen that the equivalent impedance of the piezoelectric ceramic decreases with an increasing frequency of an input alternating current signal. For example, as shown in FIG. 5, a frequency impedance characteristic curve of a 4.2-microfarad piezoelectric ceramic is shown. An equivalent impedance of a piezoelectric ceramic is approximately 160 ohms (Ohm) when a frequency of an alternating current signal of the piezoelectric ceramic with 4.2 microfarad (uF) is 200 hertz (Hz), and the equivalent impedance of the piezoelectric ceramic is approximately 3.7 ohms (Ohm) when the frequency of the alternating current signal of the piezoelectric ceramic with 4.2 microfarad (uF) is 10 k Hz (Hz).

It should be noted that, actually, a screen sound production component formed of a multi-layer piezoelectric ceramic includes not only a piezoelectric ceramic (that is, a capacitive component), but also an electrode lead, a dielectric material, another component, and the like. Therefore, an equivalent impedance of the screen sound production component formed of the multi-layer piezoelectric ceramic is a non-linear curve, and is related to a temperature, a frequency, a material, and the like. In addition, when the screen sound production component is normal, a frequency resistance characteristic curve of the screen sound production component tends to be consistent. That is, as the frequency of the alternating current signal increases, the impedance of the screen sound production component decreases.

Figure 6:
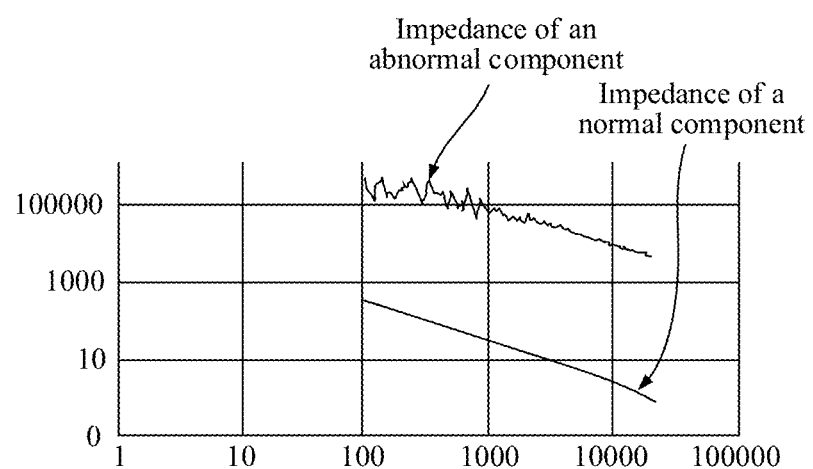
FIG. 6 is a comparison diagram of a frequency resistance characteristic curve of a normal screen sound production component and an abnormal screen sound production component according to an embodiment of this application.

However, in a use process of an electronic device, the screen sound production component (for example, a piezoelectric ceramic) may be broken, and a failure may occur on a component, for example, an internal electrode falls off, and encounters short circuit, breakdown, or depolarization. When the screen sound production component (such as a piezoelectric ceramic) fails, a physical characteristic of the screen sound production component changes, which is usually reflected in a change of a capacitance, an impedance, a load current, a load voltage, and an acoustic frequency response. For example, when the screen sound production component fails, the impedance of the screen sound production component deviates from a normal value, for example, becomes extremely small or extremely large. FIG. 6 is a comparison between frequency resistance characteristic curves of a normal screen sound production component and an abnormal screen sound production component, where a horizontal coordinate of FIG. 6 is a frequency, in units of Hz; and a vertical coordinate of FIG. 6 is an impedance, in units of ohm (Ω). It can be learned from FIG. 6 that the impedance of the abnormal screen sound production component (that is, a screen sound production component after failure) is far greater than the impedance of the normal screen sound production component, and the frequency resistance characteristic curve of the abnormal screen sound production component has a relatively large fluctuation. It should be understood that, because the admittance is a reciprocal of the impedance, the admittance of the abnormal screen sound production component is also greatly different from the admittance of the normal screen sound production component.

In conclusion, in the use process of the electronic device, the load current and the load voltage of the screen sound production component may be detected, and the current impedance or admittance of the screen sound production component may be calculated by using the load current and the load voltage. Then, the detected load current may be compared with the load current of the screen sound production component in a normal case, or the detected load voltage is compared with the load voltage of the screen sound production component in a normal case, or the current impedance or admittance of the screen sound production component is compared with the impedance or admittance of the screen sound production component in a normal case, to determine whether the screen sound production component fails.

Typically, a manufacturer of the screen sound production component provides data corresponding to the impedance-frequency of the screen sound production component. For example, Table 1 below shows an average impedance and an impedance deviation corresponding to a 2.5 uF piezoelectric ceramic (that is, the screen sound production component) at different frequencies.

TABLE 1

Average impedance corresponding to different frequencies of the piezoelectric ceramic (capacitance value of about 2.5 uF)

| Frequency f (Hz) | Average impedance Z (Ω) | Deviation % | Impedance range Z (Ω) |
|---|---|---|---|
| 100 | 383.92 | ±4.2% | 367.80~400.04 |
| 500 | 80.18 | ±3.7% | 77.21~83.15 |
| 1000 | 40.72 | ±4.2% | 39.01~42.43 |
| 10000 | 3.78 | ±6.2% | 3.546~4.014 |
| 19000 | 1.194 | ±14.5% | 1.021~1.367 |

For example, in this embodiment of this application, when the screen sound production component (such as a piezoelectric ceramic) is normal (without failure), audio signals of various frequencies may be played by using the screen sound production component, for example, a single-frequency audio signal of each frequency may be played. When the screen sound production component plays a single-frequency audio signal of each frequency, the load voltage and the load current of the screen sound production component are detected as a voltage threshold and a current threshold of the screen sound production component when being normal (without failure).

It should be understood that, to intelligently control the screen sound production component, generally, the screen sound production component is connected to a smart power amplifier (smart PA) hardware circuit.

Figure 7:
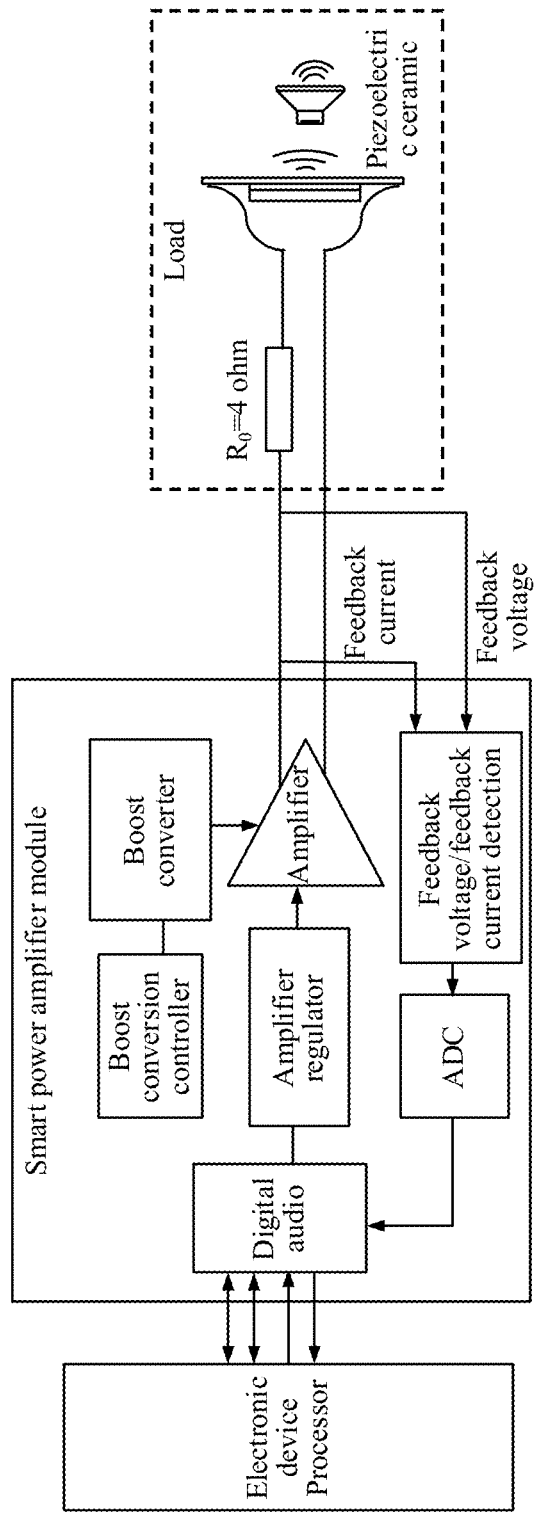
FIG. 7 is a hardware circuit diagram of a smart power amplifier (smart PA) according to an embodiment of this application.

For example, FIG. 7 is a schematic diagram of a structure of a smart PA (smart PA) hardware circuit. Referring to FIG. 7, a screen sound production component (such as a piezoelectric ceramic) is coupled to an application processor of an electronic device to detect a feedback current (that is, a load current) and a feedback voltage (that is, a load voltage) of the screen sound production component by using a smart power amplifier module in a process of playing an audio by the screen sound production component, and calculate an impedance of the screen sound production component based on the feedback current and the feedback voltage of the screen sound production component. The smart power amplifier module may control a physical parameter (such as a temperature and an amplitude) of the screen sound production component (such as a piezoelectric ceramic) based on the calculated impedance of the screen sound production component. In addition, to avoid burning of the component due to an excessive current, a protection resistor R0 with 4 ohms is connected in series on a current path of the screen sound production component in the hardware circuit.

The smart power amplifier module includes a feedback voltage/feedback current detection module, an ADC module, and a digital audio module. The feedback voltage/feedback current detection module is configured to detect a load current and a load voltage in real time, and the load current and the load voltage obtained by the feedback voltage/feedback current detection module are converted into a digital signal by using the ADC module, so as to transmit the digital signal to the digital audio module. The digital audio module may calculate a load impedance based on the load current and the load voltage. A current temperature of the screen sound production component (such as a piezoelectric ceramic) may be determined based on a change relationship between the temperature and the impedance of the screen sound production component (such as a piezoelectric ceramic). When the current temperature of the screen sound production component (such as a piezoelectric ceramic) exceeds a preset temperature of the screen sound production component, the digital audio module may control an amplifier regulator to adjust an amplification multiple of the amplifier.

Similarly, after calculating the load impedance, the digital audio module may determine an amplitude of the screen sound production component (such as a piezoelectric ceramic) based on the resistance, the current, and a TS parameter of the screen sound production component (such as a piezoelectric ceramic). When the amplitude of the screen sound production component is too large, for example, exceeds 0.6, the digital audio module may control the amplifier regulator to adjust the amplification multiple of the amplifier to reduce the amplitude of the screen sound production component.

Therefore, the smart power amplifier module shown in FIG. 7 can detect and obtain the load current and the load voltage of the screen sound production component. It should be understood that because the protection resistor R0 is connected in series in the circuit, the load voltage detected by the smart power amplifier module is a sum of a voltage of the protection resistor R0 and the voltage of the screen sound production component (such as a piezoelectric ceramic).

For example, in this embodiment of this application, in a production test phase of the electronic device, the screen sound production component may be connected to the foregoing smart PA hardware circuit shown in FIG. 7, and the screen sound production component is controlled to separately play single-frequency audio signals of a plurality of frequencies (such as 20 Hz, 31.25 Hz, 50 Hz, 62.5 Hz, 125 Hz, 250 Hz, 500 Hz, 1000 Hz, 2000 Hz, 4000 Hz, 19 KHz, 20 KHz, and 22 KHz). When the screen sound production component plays a single-frequency audio signal of each frequency, a plurality of groups of load voltages (that is, the feedback voltage) and load currents (that is, the feedback current) are detected and obtained by using the smart power amplifier module in FIG. 7. For example, when the screen sound production component plays a single-frequency audio signal at a frequency of 50 Hz, a frequency corresponding to the detected load voltage and load current is 50 Hz.

It should be understood that there may be some random noise on a detection path of the load current and the load voltage. To reduce an error, feedback voltages and feedback currents of a plurality of frames (for example, 10 frames, 20 frames, or 30 frames) of audio signals are generally detected, and then the plurality of frames of feedback voltages are averaged to obtain a valid value of the load voltage, or the feedback currents are averaged to obtain a valid value of the load current.

For example, a valid value $Z_{rms}$ of the load voltage may be calculated by using the following formula (1): The valid value $I_{rms}$ of the load current may be calculated by using the following formula (2):

$$U_{rms} = \sqrt{\frac{1}{n}\sum_{i=1}^{n} U_i^2} = \sqrt{\frac{U_1^2 + U_2^2 + \cdots + U_n^2}{n}} \text{;} \quad \text{Formula (1)}$$

$$I_{rms} = \sqrt{\frac{1}{n}\sum_{i=1}^{n} I_i^2} = \sqrt{\frac{I_1^2 + I_2^2 + \cdots + I_n^2}{n}} \text{;} \quad \text{Formula (2)}$$

U represents the feedback voltage, I represents the feedback current, and $U_i$ represents a feedback voltage corresponding to an ith frame of audio signal; $I_i$ represents a feedback current corresponding to the ith frame of audio signal; and n represents a quantity of samples of the feedback voltage U or the feedback current I.

It should be noted that, for a frequency, after the valid value of the load voltage corresponding to the frequency and the valid value of the load current are calculated, a load impedance Z corresponding to the frequency may be calculated by using the following formula (3).

$$Z = \frac{U_{rms}}{I_{rms}} \text{;} \quad \text{Formula (3)}$$

It should be understood that because the protection resistor R0 is connected in series in the circuit, the load impedance Z calculated by using formula (3) is a sum of an impedance of the protection resistor R0 and an impedance $Z_{rms}$ of the screen sound production component (such as a piezoelectric ceramic). In this case, the impedance $Z_{rms}$ of the screen sound production component=Z−R0. The calculated load impedance Z=4.194Ω is used as an example, and the impedance $Z_{rms}$ of the screen sound production component=1.194Ω Because the admittance is a reciprocal of the impedance, after the impedance of the screen sound production component is calculated, the impedance may be inverted, to obtain the admittance of the screen sound production component, for example, $Z_{rms}$=1.194Ω, and then the admittance $Y_{rms}$=1/1.194Ω=0.837 Siemens (S).

In addition, the audio signal played by the screen sound production component may not be at a single frequency. In this case, after the feedback voltage or the feedback current of the screen sound production component is obtained, high-pass filtering or low-pass filtering may be performed to obtain a feedback voltage or a feedback current of the screen sound production component at a specific frequency (for example, 19 KHz or 32.5 Khz). Then, a load impedance of the screen sound production component at the specific frequency is calculated based on the feedback voltage or the feedback current of the screen sound production component at the specific frequency.

In conclusion, in the production test phase of the electronic device, a plurality of times of detection and calculation such as the foregoing are performed when a normal screen sound production component plays an audio at a frequency, so as to obtain a voltage range, a current range, an impedance range, or an admittance range of the screen sound production component that is corresponding to the frequency when the screen sound production component is normal (without failure). When detecting whether the screen sound production component fails is subsequently performed, the foregoing voltage range, current range, impedance range, or admittance range is used as a voltage threshold range, current threshold range, impedance threshold range, or admittance threshold range corresponding to a frequency when the screen sound production component is normal (without failure), and is used as a basis for determining whether the screen sound production component fails.

In this embodiment of this application, whether a real-time load current of the screen sound production component exceeds a corresponding current threshold range may be detected, or whether a real-time load voltage of the screen sound production component exceeds a corresponding voltage threshold range may be detected, or whether a real-time impedance of the screen sound production component exceeds a corresponding impedance threshold range may be detected, or whether a real-time admittance of the screen sound production component exceeds a corresponding admittance threshold range may be detected.

The following describes in detail the failure detection method for a screen sound production component.

Figure 8:
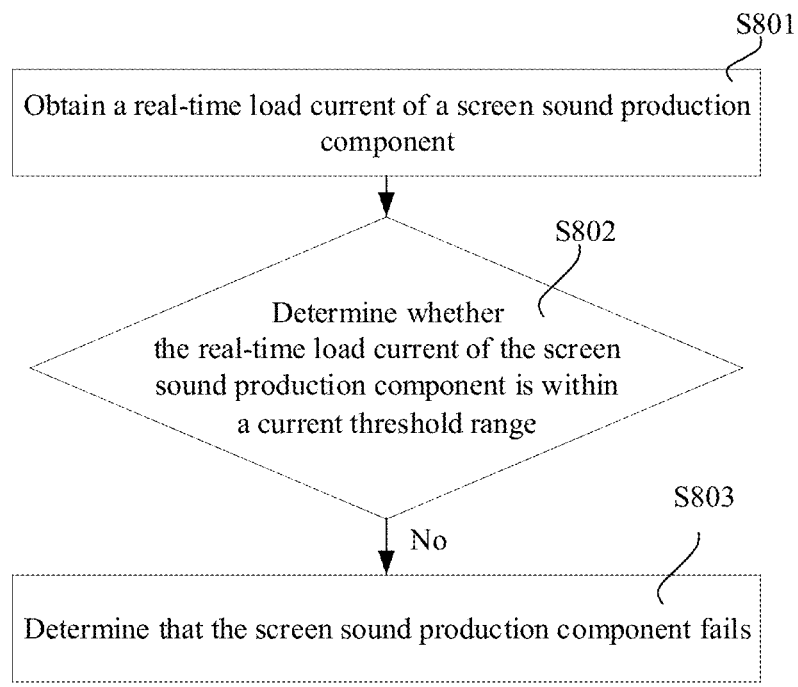
FIG. 8 is a flowchart 1 of a method for detecting whether a screen sound production component fails according to an embodiment of this application.

In some embodiments, a real-time load current of the screen sound production component is used to determine whether the screen sound production component fails. FIG. 8 is a flowchart 1 of a method for detecting whether a screen sound production component fails. Referring to FIG. 8, the method includes the following steps:

S801. Obtain a real-time load current of the screen sound production component.

For example, in a process of using the screen sound production component, for example, when an electronic device plays an audio signal (that is, a detection audio) by using the screen sound production component, the real-time load current of the screen sound production component may be obtained by using the smart power amplifier module shown in FIG. 7.

It should be understood that the audio signal played by the electronic device by using the screen sound production component may be a single-frequency audio that is inaudible or difficult to hear by a human ear, for example, an audio at a frequency of 20 Hz, 31.25 Hz, 50 Hz, 19 KHz, 20 KHz, or 22 KHz, or may be a normal audio signal audible to the human ear, for example, voice in a call, an audio in a normally played music or video file, or an audio that is specially used to detect whether the screen sound production component fails. In addition, the audio signal played by the electronic device by using the screen sound production component may be a pilot signal with a relatively small amplitude (for example, a signal at a frequency of 19 KHz) that is superimposed in a normal audio signal.

To reduce an error, feedback currents of a plurality of frames (for example, 10 frames, 20 frames, or 30 frames) of audio signals are generally detected, and then a valid value of the load currents of the plurality of frames of audio signals is calculated by using the foregoing formula (2), and is used as a real-time load current $I_{rms}$ of the current screen sound production component.

S802. Determine whether the real-time load current of the screen sound production component is within a current threshold range.

It should be understood that, when the screen sound production component is normal, the current threshold range is obtained through analysis in advance. This is described in the foregoing and is not described herein again. In this embodiment of this application, the current threshold range may be denoted as [Imin, Imax, F], where F represents a frequency corresponding to the current threshold range, Imin represents a lower limit of the current threshold range, and Imax represents an upper limit of the current threshold range.

Generally, if the load current of the screen sound production component is within the current threshold range, the screen sound production component is a normal component. On the contrary, if the load current of the screen sound production component is not within the current threshold range, that is, the load current of the screen sound production component exceeds the upper limit of the normal current threshold range, or the load current of the screen sound production component is less than the lower limit of the normal current threshold range, the screen sound production component is an abnormal component or a failure component.

In this case, a real-time load current of the screen sound production component may be compared with the current threshold range based on the real-time load current obtained in S801, to determine whether the real-time load current of the screen sound production component is within the current threshold range. When the load current of the screen sound production component is not within the normal current threshold range, the following S803 may be performed to determine that the screen sound production component fails.

It should be understood that when the screen sound production component plays audio signals at different frequencies, current threshold ranges of the screen sound production component are different. In a process of performing determining in S802, the frequency of the played audio signal needs to be first determined, and then the obtained real-time load current of the screen sound production component is compared with a current threshold range corresponding to the frequency of the audio signal.

For example, if the played audio signal is a single-frequency audio, such as a single-frequency audio of 19 KHz, when the real-time load current of the screen sound production component is obtained in S801, the real-time load current of the screen sound production component obtained in S801 may be compared with a current threshold range of the screen sound production component at the frequency of 19 KHz.

For another example, if the played audio signal is a normal audio signal audible to the human ear, such as a voice signal in a call, a normally played music or video, when the real-time load current of the screen sound production component is obtained in S801, a frequency (denoted as a frequency A) of a center frequency point of a frequency band on which main energy of the normal audio signal is located may be analyzed. By analyzing the center frequency point of the frequency band on which the main energy of the normal audio signal is located, load currents (that is, feedback currents) or load voltages (that is, feedback voltages) corresponding to continuous N frames of audio signals may be first obtained by using the smart power amplifier module. Then, fast Fourier transform (fast Fourier transform, FFT) is performed on the load currents or the load voltages to convert them into frequency domain signals, and it may be determined through analysis whether frequency points at which most main energy of the continuous N frames of audio signals is located are the same. If the same, the real-time load current of the screen sound production component may be calculated by using the foregoing formula (2), and a frequency corresponding to the real-time load current is the frequency A. If different, the playback continues, a load current (that is, a feedback current) corresponding to an audio signal of a subsequent frame is obtained, and the foregoing step is repeated to analyze a center frequency point of a frequency band on which main energy of a normal audio signal is located. Finally, the real-time load current of the screen sound production component obtained in S801 may be compared with the current threshold range of the screen sound production component at the frequency A.

For another example, if the played audio signal is an audio signal superimposed with a pilot signal (for example, a signal at 19 KHz) when the real-time load current of the screen sound production component is obtained in S801, generally, when the impedance of the screen sound production component rapidly increases, the load current obtained by the smart power amplifier module rapidly decreases compared with a normal component. Therefore, the real-time load current obtained in S801 is compared with a current threshold range in a full frequency domain to determine whether the screen sound production component fails. It should be understood that the current threshold range in the full frequency domain may be obtained by playing an audio signal in the full frequency domain when the screen sound production component is normal. An obtaining method is similar to the foregoing method for obtaining the current threshold range for a single frequency, and details are not described herein again.

Certainly, in this case, the real-time load current corresponding to a frequency (denoted as a frequency B) on which the pilot signal is located may also be obtained in a high-pass filtering manner, and then the real-time load current is compared with a current threshold range of the screen sound production component at the frequency B.

For example, the following code may be used to determine whether the screen sound production component fails:
  brokenFlag=false; //the screen sound production component does not fail by default;
  if $((I_{rms}>Imax)||(I_{rms}<Imin))$//the resistance exceeds the upper limit of the current threshold range or is less than the lower limit of the current threshold range;

brokenFlag=true; //the screen sound production component is marked as failed;

S803. Determine that the screen sound production component fails.

For example, when brokenFlag=true in the foregoing code, it may be determined that the screen sound production component fails.

Figure 9:
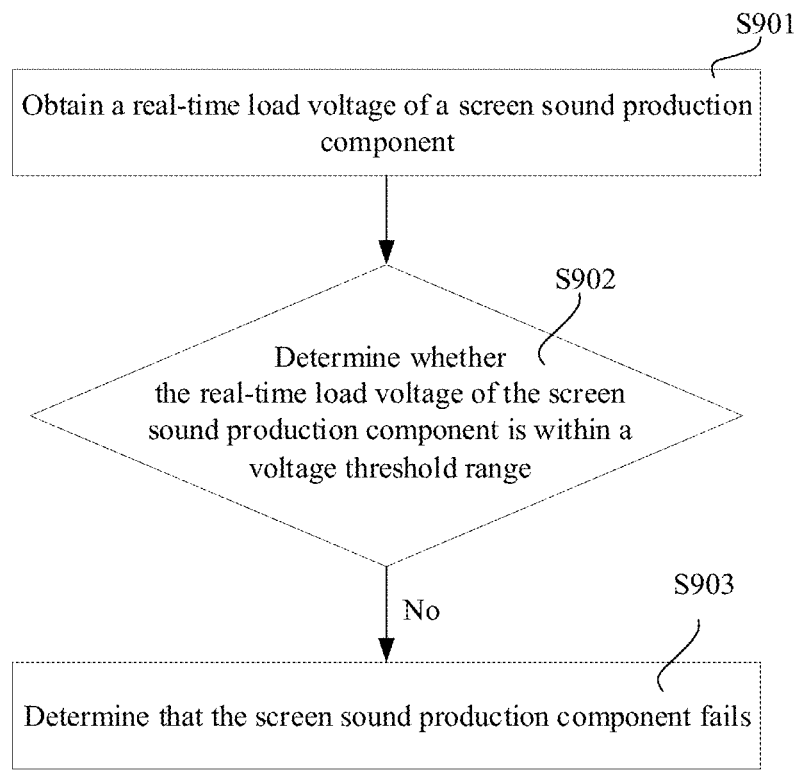
FIG. 9 is a flowchart 2 of a method for detecting whether a screen sound production component fails according to an embodiment of this application.

In some embodiments, a real-time load voltage is used to determine whether the screen sound production component fails. FIG. 9 is a flowchart 2 of a method for determining whether a screen sound production component fails. Referring to FIG. 9, the method includes the following steps:

S901. Obtain a load voltage of the screen sound production component.

For example, in a process of using the screen sound production component, for example, when an electronic device plays an audio signal by using the screen sound production component, the real-time load voltage of the screen sound production component may be obtained by using the smart power amplifier module shown in FIG. 7.

It should be understood that the audio signal played by the electronic device by using the screen sound production component may be a single-frequency audio that is inaudible or difficult to hear by a human ear, for example, an audio at a frequency of 20 Hz, 31.25 Hz, 50 Hz, 19 KHz, 20 KHz, or 22 KHz, or may be a normal audio signal audible to the human ear, for example, voice in a call, an audio in a normally played music or video file, or an audio that is specially used to detect whether the screen sound production component fails. In addition, the audio signal played by the electronic device by using the screen sound production component may be a pilot signal with a relatively small amplitude (for example, a signal at a frequency of 19 KHz) that is superimposed in a normal audio signal.

To reduce an error, feedback voltages of a plurality of frames (for example, 10 frames, 20 frames, or 30 frames) of audio signals are generally obtained, and then a valid value of the load voltages of the plurality of frames of audio signals is calculated by using the foregoing formula (1), and is used as a real-time load voltage $U_{rms}$ of the current screen sound production component.

S902. Determine whether the real-time load voltage of the screen sound production component is within a voltage threshold range.

It should be understood that, when the screen sound production component is normal, the voltage threshold range is obtained through analysis in advance. This is described in the foregoing and is not described herein again. In this embodiment of this application, the voltage threshold range may be denoted as [Umin, Umax, F], where F represents a frequency corresponding to the voltage threshold range, Umin represents a lower limit of the voltage threshold range, and Umax represents an upper limit of the voltage threshold range.

Generally, if the load voltage of the screen sound production component is within the voltage threshold range, the screen sound production component is a normal component. On the contrary, if the load voltage of the screen sound production component is not within the voltage threshold range, that is, the load voltage of the screen sound production component exceeds the upper limit of the voltage threshold range, or the load voltage of the screen sound production component is less than the lower limit of the voltage threshold range, the screen sound production component is an abnormal component or a failure component.

In this case, a real-time load voltage of the screen sound production component may be compared with the voltage threshold range based on the real-time load voltage obtained in S901, to determine whether the real-time load voltage of the screen sound production component is within the voltage threshold range. When the real-time load voltage of the screen sound production component is not within the voltage threshold range, the following S903 may be performed to determine that the screen sound production component fails.

It should be understood that when the screen sound production component plays audio signals at different frequencies, voltage threshold ranges of the screen sound production component are different. In a process of performing determining in S902, the frequency of the played audio signal needs to be first determined, and then the obtained real-time load voltage of the screen sound production component is compared with a voltage threshold range corresponding to the frequency of the audio signal.

For example, if the played audio signal is a single-frequency audio, such as a single-frequency audio of 19 KHz, when the real-time load voltage of the screen sound production component is obtained in S901, the real-time load voltage of the screen sound production component obtained in S901 may be compared with a voltage threshold range of the screen sound production component at the frequency of 19 KHz.

For another example, if the played audio signal is a normal audio signal audible to the human ear, such as a voice signal in a call, a normally played music or video, when the real-time load voltage of the screen sound production component is obtained in S901, a frequency (denoted as a frequency A) of a center frequency point of a frequency band on which main energy of the normal audio signal is located may be analyzed (for an analysis process, references may be made to related descriptions in S802), and then the real-time load voltage of the screen sound production component obtained in S901 may be compared with a voltage threshold range of the screen sound production component at the frequency A.

For another example, if the played audio signal is an audio signal superimposed with a pilot signal (for example, a signal at 19 KHz) when the real-time load voltage of the screen sound production component is obtained in S901, In this case, the real-time load voltage corresponding to a frequency (denoted as a frequency B) on which the pilot signal is located may also be obtained in a high-pass filtering manner, and then the real-time load voltage is compared with a voltage threshold range of the screen sound production component at the frequency B.

For example, the following code may be used to determine whether the screen sound production component fails:
brokenFlag=false; //the screen sound production component does not fail by default;
if (($U_{rms}$>Umax)||($U_{rms}$<Umin))//the resistance exceeds the upper limit of the voltage threshold range or is less than the lower limit of the voltage threshold range;
brokenFlag=true; //the screen sound production component is marked as failed;

S903. Determine that the screen sound production component fails.

For example, when brokenFlag=true in the foregoing code, it may be determined that the screen sound production component fails.

Figure 10A:
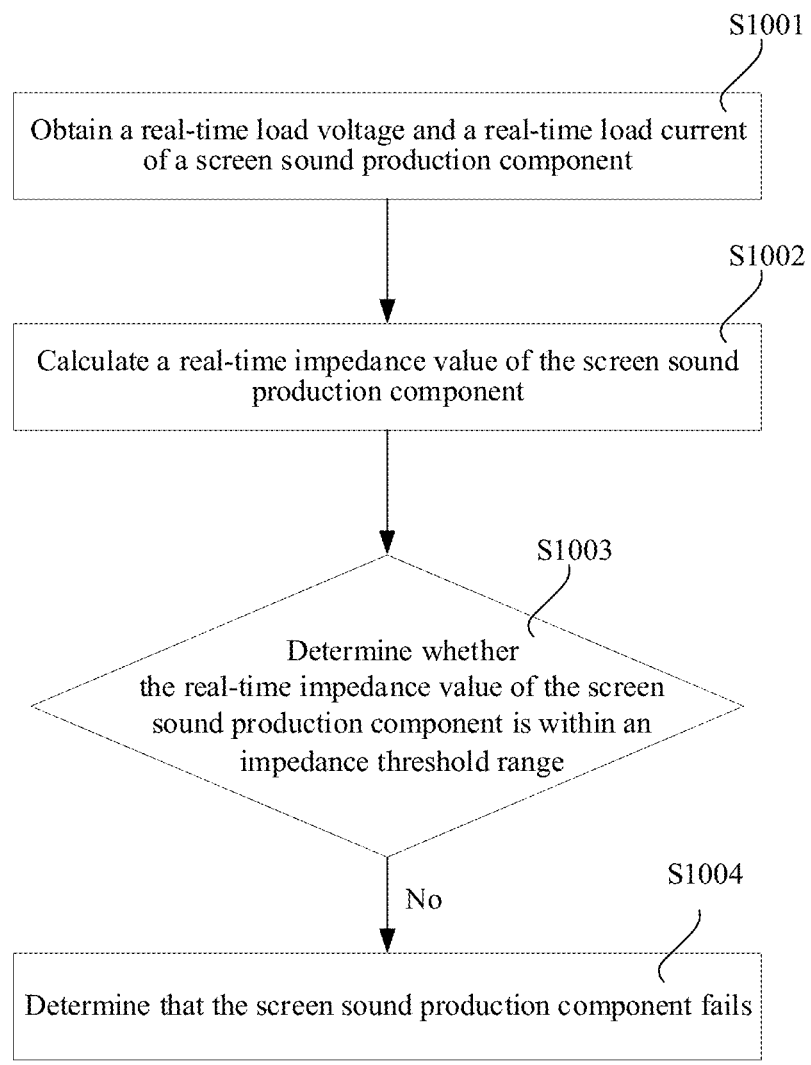
FIG. 10A is a flowchart 3 of a method for detecting whether a screen sound production component fails according to an embodiment of this application.

In some embodiments, a real-time impedance of the screen sound production component may be used to determine whether the screen sound production component fails. FIG. 10A is a flowchart 3 of a method for determining whether a screen sound production component fails. Referring to FIG. 10A, the method includes the following steps:

S1001. Obtain a real-time load voltage and a real-time load current of the screen sound production component.

For example, when an electronic device plays an audio signal by using the screen sound production component, a load current and a load voltage of the screen sound production component may be obtained by using the smart power amplifier module shown in FIG. 7.

It should be understood that the audio signal played by the electronic device by using the screen sound production component may be a single-frequency audio that is inaudible or difficult to hear by a human ear, for example, an audio at a frequency of 20 Hz, 31.25 Hz, 50 Hz, 19 KHz, 20 KHz, or 22 KHz, or may be a normal audio signal audible to the human ear, for example, voice in a call, an audio in a normally played music or video file, or an audio that is specially used to detect whether the screen sound production component fails. In addition, the audio signal played by the electronic device by using the screen sound production component may be a pilot signal with a relatively small amplitude (for example, a signal at a frequency of 19 KHz) that is superimposed in a normal audio signal.

To reduce an error, feedback voltage values and feedback current values of a plurality of frames (for example, 10 frames, 20 frames, or 30 frames) of audio signals are generally obtained, and then a valid value of the load voltages of the plurality of frames of audio signals is calculated by using the foregoing formula (1), and is used as a load voltage of the current screen sound production component. A valid value of the load currents of the plurality of frames of audio signals is calculated by using the foregoing formula (2), and is used as a real-time load current of the current screen sound production component.

S1002. Calculate a real-time impedance value of the screen sound production component.

It should be understood that a load impedance Z may be calculated according to the foregoing formula (3) based on the foregoing real-time load voltage and load current of the screen sound production component obtained in S1001. Because the protection resistor R0 is disposed in the smart PA hardware circuit shown in FIG. 7, the real-time impedance of the screen sound production component $Z_{rms}=Z-R0$, that is, $Z_{rms}=Z-4$.

S1003. Determine whether the real-time impedance value of the screen sound production component is within an impedance threshold range.

It should be understood that a normal impedance range may be obtained from a factory parameter of the screen sound production component, or may be obtained through analysis in advance when the screen sound production component is normal. This is described in the foregoing and is not described herein again. In this embodiment of this application, the impedance threshold range may be denoted as [Zmin, Zmax, F], where F denotes a frequency corresponding to the impedance threshold range, Zmin denotes a lower limit of the impedance threshold range, and Zmax denotes an upper limit of the impedance threshold range.

Generally, if the real-time impedance of the screen sound production component is within the impedance threshold range, the screen sound production component is a normal component. On the contrary, if the real-time impedance of the screen sound production component is not within the impedance threshold range, that is, the real-time impedance of the screen sound production component exceeds the upper limit of the impedance threshold range, or the real-time impedance of the screen sound production component is less than the lower limit of the impedance threshold range, the screen sound production component is an abnormal component or a failure component.

In this case, the real-time impedance of the screen sound production component may be compared with the impedance threshold range calculated in S1002, to determine whether the real-time impedance of the screen sound production component is within the impedance threshold range. When the real-time impedance of the screen sound production component is not within the impedance threshold range, the following S1004 may be performed to determine that the screen sound production component fails.

It should be understood that when the screen sound production component plays audio signals at different frequencies, impedance threshold ranges of the screen sound production component are different. In a process of performing determining in S1003, the frequency of the played audio signal needs to be first determined, and then the real-time impedance of the screen sound production component calculated in S1002 is compared with an impedance threshold range corresponding to the frequency of the audio signal.

For example, if the played audio signal is a single-frequency audio, such as a single-frequency audio of 19 KHz, when the load voltage and the load current of the screen sound production component are obtained in S1001, the impedance of the screen sound production component calculated in S1002 may be compared with a normal impedance range of the screen sound production component at the frequency of 19 KHz.

For another example, if the played audio signal is a normal audio signal audible to the human ear, such as a voice signal in a call, a normally played music or video, when the real-time load voltage and the real-time load current of the screen sound production component is obtained in S1001, a frequency (denoted as a frequency A) of a center frequency point of a frequency band on which main energy of the normal audio signal is located may be analyzed (for an analysis process, references may be made to related descriptions in S802), and then the real-time impedance of the screen sound production component obtained in S1002 may be compared with an impedance threshold range of the screen sound production component at the frequency A.

For another example, if the played audio signal is an audio signal superimposed with a pilot signal (for example, a signal at 19 KHz) when the real-time load voltage and the real-time load current of the screen sound production component are obtained in S1001, In this case, after the real-time load voltage and the real-time load current of the screen sound production component are obtained by using the smart power amplifier module in S1001, a real-time load voltage and a real-time load current of the screen sound production component at a frequency (denoted as a frequency B) on which a pilot signal is located may be obtained in a high-pass filtering manner. Then, in S1002, the real-time load voltage and the real-time load current corresponding to the frequency B are calculated by using the foregoing formula (3) to obtain a real-time impedance of the screen sound production component. Finally, the real-time impedance is compared with an impedance threshold range of the screen sound production component at the frequency B.

For example, the following code may be used to determine whether the screen sound production component fails:
brokenFlag=false; //the screen sound production component does not fail by default;
if (($Z_{rms}$>Zmax)||($Z_{rms}$<Zmin)); //the impedance exceeds the upper limit of the impedance threshold or is less than the lower limit of the impedance threshold;

brokenFlag=true; //the screen sound production component is marked as failed;

S1004. Determine that the screen sound production component fails.

For example, when brokenFlag=true in the foregoing code, it may be determined that the screen sound production component fails.

Figure 10B:
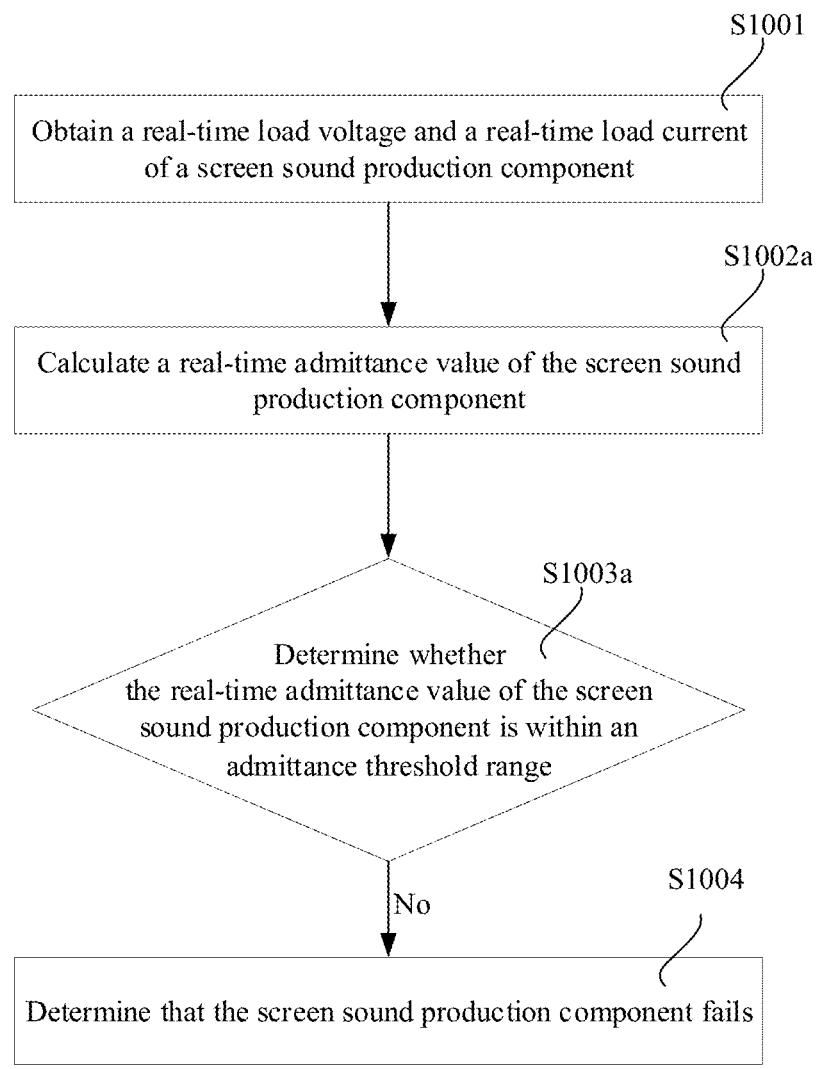
FIG. 10B is a flowchart 4 of a method for detecting whether a screen sound production component fails according to an embodiment of this application.

In some embodiments, a real-time admittance of the screen sound production component may be used to determine whether the screen sound production component fails. FIG. 10B is a flowchart 4 of a method for determining whether a screen sound production component fails. Referring to FIG. 10B, a difference between the method and the method shown in FIG. 10B lies in that S1002 is replaced with the following S1002a, and S1003 is replaced with the following S1003a.

S1002a. Calculate a real-time admittance value of the screen sound production component.

After the real-time impedance $Z_{rms}$ of the screen sound production component is calculated according to S1002, a reciprocal of the real-time impedance $Z_{rms}$ of the screen sound production component may be obtained, to obtain the real-time admittance $Y_{rms}$ of the screen sound production component, that is, $Y_{rms}=1/Z-4$.

S1003a. Determine whether the real-time admittance value of the screen sound production component is within an admittance threshold range.

Similarly, in this embodiment of this application, the admittance threshold range may be denoted as [Ymin, Ymax, F], where F represents a frequency corresponding to the admittance threshold range, Ymin represents a lower limit of the admittance threshold range, and Ymax represents an upper limit of the admittance threshold range.

Generally, if the real-time admittance of the screen sound production component is within the admittance threshold range, the screen sound production component is a normal component. On the contrary, if the real-time admittance of the screen sound production component is not within the admittance threshold range, that is, the real-time admittance of the screen sound production component exceeds the upper limit of the admittance threshold range, or the real-time admittance of the screen sound production component is lower than the lower limit of the admittance threshold range, the screen sound production component is an abnormal component or a failure component.

In this case, the real-time admittance of the screen sound production component may be compared with the admittance threshold range calculated according to S1002a, to determine whether the real-time admittance of the screen sound production component is within the admittance threshold range. When the real-time admittance of the screen sound production component is not within the admittance threshold range, S1004 may be performed to determine that the screen sound production component fails.

It should be understood that when the screen sound production component plays audio signals at different frequencies, admittance threshold ranges of the screen sound production component are different. In a process of performing determining in S1003a, the frequency of the played audio signal needs to be first determined, and then the real-time admittance of the screen sound production component calculated in S1002a is compared with an admittance threshold range corresponding to the frequency of the audio signal.

For example, if the played audio signal is a single-frequency audio, such as a single-frequency audio of 19 KHz, when the load voltage and the load current of the screen sound production component are obtained in S1001, the admittance of the screen sound production component calculated in S1002a may be compared with an admittance threshold range of the screen sound production component at the frequency of 19 KHz.

For another example, if the played audio signal is a normal audio signal audible to the human ear, such as a voice signal in a call, a normally played music or video, when the real-time load voltage and the real-time load current of the screen sound production component is obtained in S1001, a frequency (denoted as a frequency A) of a center frequency point of a frequency band on which main energy of the normal audio signal is located may be analyzed (for an analysis process, references may be made to related descriptions in S802), and then the real-time admittance of the screen sound production component obtained in S1002 may be compared with an admittance threshold range of the screen sound production component at the frequency A.

For another example, if the played audio signal is an audio signal superimposed with a pilot signal (for example, a signal at 19 KHz) when the real-time load voltage and the real-time load current of the screen sound production component are obtained in S1001, references may be made to descriptions of related content in S1003, and details are not described herein again.

For example, the following code may be used to determine whether the screen sound production component fails:

brokenFlag=false; //the screen sound production component does not fail by default;

if ((Y$_{rms}$>Ymax)||(Y$_{rms}$<Ymin)); //the admittance exceeds the upper limit of the admittance threshold range or is less than the lower limit of the admittance threshold range;

brokenFlag=true; //the screen sound production component is marked as failed;

It should be noted that, in a failure scenario of some components, such as electrode falling off, short circuit, and breakdown, impedance of a component increases rapidly at a same frequency. In this case, a load current of a failed screen sound production component decreases rapidly compared with a load current of a normal screen sound production component. Therefore, whether the load current is within a normal current range may be determined to determine whether the screen sound production component fails (that is, abnormal). In a failure scenario of another component, for example, a failure scenario in which a component is broken or depolarized, a load current of a failed screen sound production component may be relatively close to a normal value (that is, a current threshold range). In this case, it may be determined, by calculating whether an impedance of a screen sound production component at a frequency is within an impedance threshold range, whether the screen sound production component fails (that is, abnormal).

Figure 11:
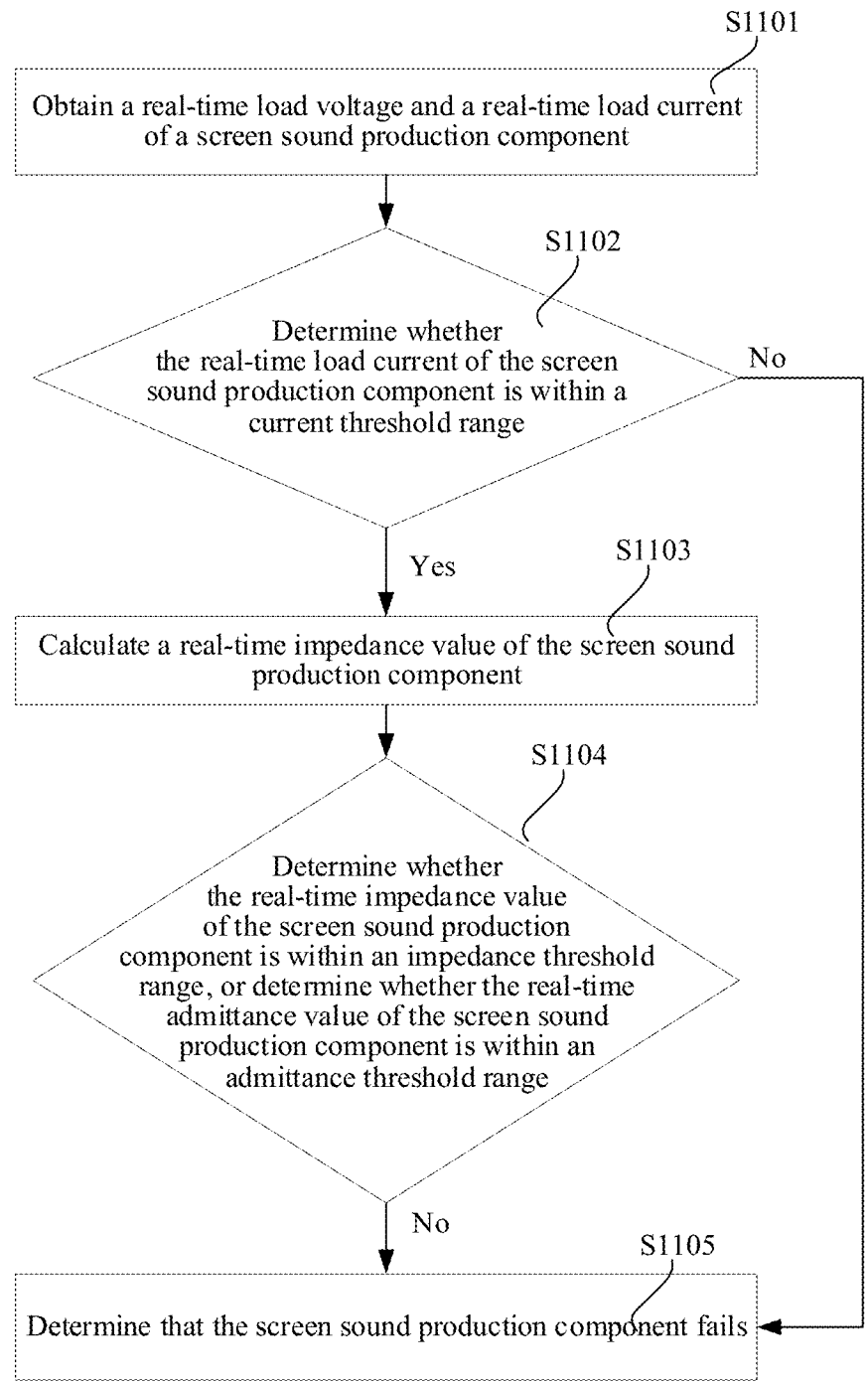
FIG. 11 is a flowchart 5 of a failure detection method for a screen sound production component according to an embodiment of this application.

Based on this, to reduce a procedure, reduce power consumption, and improve detection accuracy, in some embodiments, it may be determined, in a manner of determining a combination of a load current and an impedance, whether a screen sound production component fails. FIG. 11 is a flowchart 5 of a method for detecting whether a screen sound production component fails. Referring to FIG. 11, the detection method includes the following steps:

S1101. Obtain a real-time load voltage and a real-time load current of the screen sound production component.

Refer to S1001. Details are not described herein again.

S1102. Determine whether the real-time load current of the screen sound production component is within a current threshold range.

Refer to S902. Details are not described herein again.

S1103. Calculate a real-time impedance value or a real-time admittance value of the screen sound production component.

Refer to S1002 or S1002a. Details are not described herein again.

S1104. Determine whether the real-time impedance value of the screen sound production component is within an impedance threshold range, or determine whether the real-time admittance value of the screen sound production component is within an admittance threshold range.

Refer to S1004 or S1004a. Details are not described herein again.

S1105. Determine that the screen sound production component fails.

The following uses an example in which an electronic device is a mobile phone, and with reference to a system architecture and a flowchart, describes in detail the audio playback method provided in the embodiment of this application.

A software system of the electronic device (such as a mobile phone) may use a layered architecture, an event-driven architecture, a microkernel architecture, a micro service architecture, or a cloud architecture. In this embodiment of this application, an Android system of a layered architecture is used as an example to illustrate a software structure of the mobile phone. Certainly, in another operating system, a function implemented by each function module is similar to this embodiment of this application.

Figure 12:
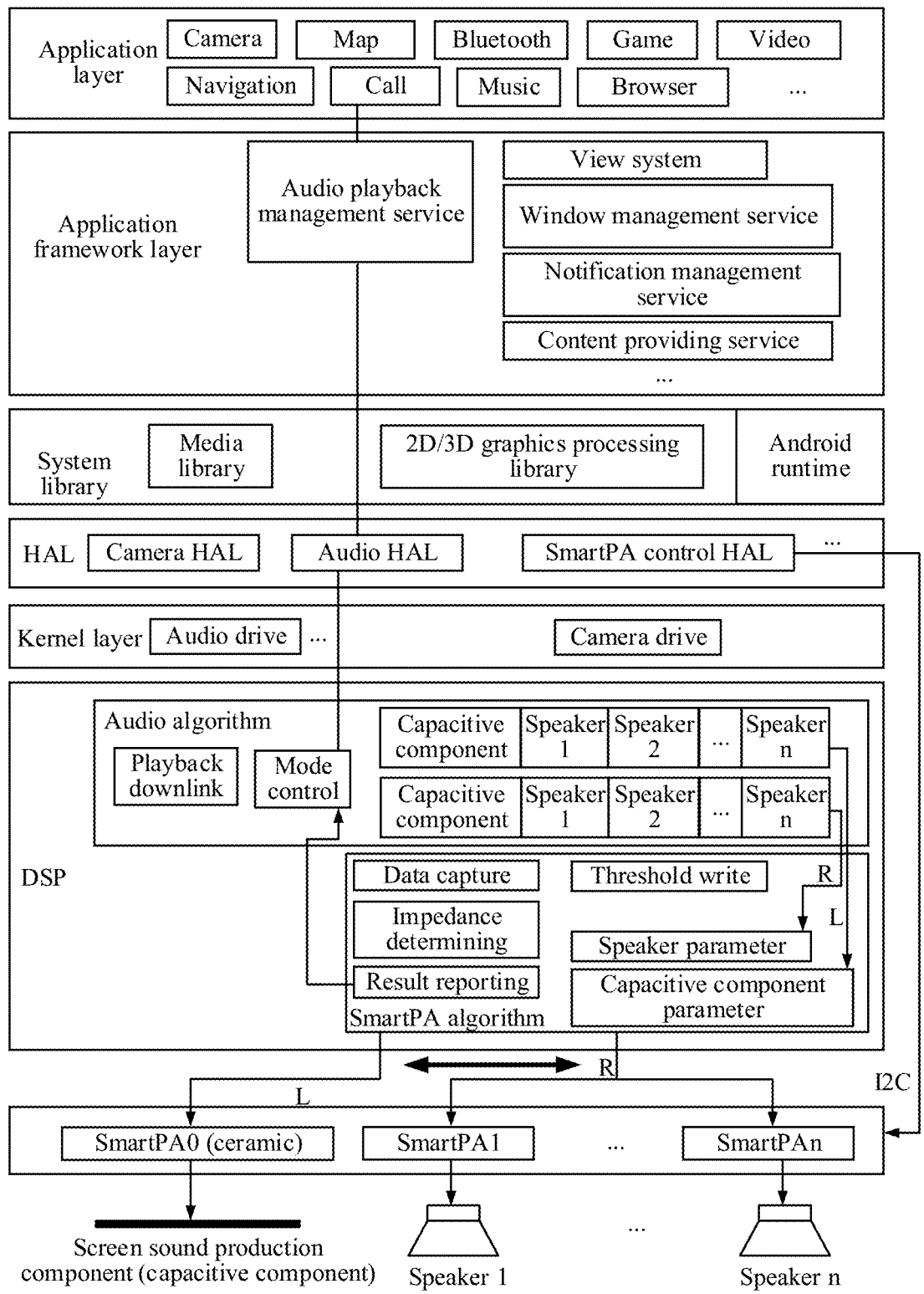
FIG. 12 is a block diagram of a software structure of an electronic device according to an embodiment of this application.

FIG. 12 is a block diagram of a software architecture of an electronic device according to an embodiment of this application.

In the layered architecture, software is divided into several layers, and each layer has a clear role and task. The layers communicate with each other through a software interface. In some embodiments, an Android system is divided into five layers: an application layer, an application framework layer (framework), an Android runtime (Android runtime), a system library (libraries), an HAL (hardware abstraction layer, hardware abstraction layer), and a kernel layer (kernel).

The application layer may include a series of application packages.

As shown in FIG. 12, an application (application) such as call, memo, browser, contacts, camera, gallery, calendar, map, Bluetooth, music, video, and SMS message may be installed at the application layer.

The application framework layer provides an application programming interface (application programming interface, API) and a programming framework for an application at the application layer. The application framework layer includes some predefined functions.

As shown in FIG. 12, an audio playback management service is disposed in the application framework layer. The audio playback management service may be used to initialize an audio and video player, obtain a volume of a current audio, adjust a volume of audio playback, and increase a sound effect.

In addition, the application framework layer may further include a window management service, a content providing service, a view system, a resource management service, a notification management service, and the like. This is not limited in this embodiment of this application.

For example, the window management service is configured to manage a window program. The window management service may obtain a size of the display screen, determine whether there is a status bar, lock the screen, take a screenshot, and the like. The content providing service is used to store and obtain data and make the data accessible to an application. The data may include a video, an image, an audio, calls that are made and received, a browsing history and bookmarks, an address book, and the like. The view system may be configured to construct a display interface of an application. Each display interface may be composed of one or more controls. Generally, the control may include interface elements such as icon, button, menu, tab, text box, dialog box, status bar, navigation bar, and widget (Widget). The resource management service provides various resources such as a localized character string, an icon, an image, a layout file, and a video file for an application. The notification management service enables an application to display notification information in the status bar that may be used to convey a message of a notification type, where the message may disappear automatically after a short stay without user interaction. For example, the notification management service is used to notify a user of download completion or remind a user of a message. The notification manager may alternatively display a notification in a form of a chart or a scroll bar text in a status bar at the top of the system, for example, a notification of an application run in the background, or may display a notification in a form of a dialog window on the screen. For example, text information is prompted for in the status bar, an announcement is produced, the mobile phone vibrates, or the indicator light blinks.

Still as shown in FIG. 12, the HAL of the mobile phone provides HALs corresponding to different hardware modules of the mobile phone, for example, an Audio HAL, a Camera HAL, a Wi-Fi HAL, and a smart PA control HAL.

The Audio HAL may be corresponding to an audio output component (such as a speaker or a screen sound production component) by using an audio drive of the kernel layer. When a plurality of audio output components (such as a plurality of speakers or screen sound production components) are disposed on the mobile phone, the plurality of audio output components are respectively corresponding to a plurality of audio drives at the kernel layer.

The smart PA control HAL is corresponding to a smart PA hardware circuit by using a smart PA algorithm in a DSP. For example, when the screen sound production component fails, the smart PA control HAL may control the smart PA algorithm to be disabled and stop running. When the screen sound production component fails, the smart PA control HAL may further control the smart PA hardware circuit (for example, a hardware circuit (smart PA0) of the screen sound production component) to be disabled by using an I2C signal, so as to reduce power consumption of the electronic device.

The Android runtime includes a core library and a virtual machine. The Android runtime is responsible for scheduling and managing the Android system.

The kernel library includes two parts: one part is a functional function that needs to be invoked by a java language, and the other part is the kernel library of Android.

The application layer and the application framework layer are run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, For example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications. The media library supports playback and recording in a plurality of commonly used audio and video formats, and static image files. The media library may support a plurality of audio/video coding formats such as MPEG4, H.264, MP3, AAC, AMR, JPG, and PNG. The three-dimensional graphics processing library is configured to implement drawing of three-dimensional graphics, image rendering, synthesis, layer processing, and the like. The 2D graphics engine is a drawing engine for 2D graphics.

The kernel layer is located below the HAL, and is a layer between hardware and software. In addition to the foregoing audio drive, the kernel layer may further include a display drive, a camera drive, a sensor drive, and the like. This is not limited in this embodiment of this application.

It should be noted that, below the kernel layer is the hardware circuit. For example, in this embodiment of this application, a digital signal processing (digital signal processing, DSP) chip is included, and a smart PA algorithm module, an audio algorithm module, and the like run on the DSP chip. The smart PA algorithm module is configured to: determine, based on a load voltage, a load current, and an impedance or an admittance of the screen sound production component (such as a piezoelectric ceramic), whether the screen sound production component (such as a piezoelectric ceramic) fails (abnormal), and report a result to the audio algorithm module when the screen sound production component (such as a piezoelectric ceramic) is abnormal. The audio algorithm module controls switching of the sound production component, such as switching the screen sound production component (such as a piezoelectric ceramic, that is, a capacitive component) to the speaker for sound production.

The detected abnormality result of the smart PA algorithm module may also be reported to the HAL layer by using the audio algorithm module, so as to instruct the user to replace the component or disable a dual-sound production unit switching function. The smart PA control HAL in the HAL layer can control an impedance detection function in the smart PA algorithm to be disabled, and control the smart PA hardware circuit (such as the hardware circuit (smart PA0) of the screen sound production component) to be disabled by using an I2C signal, so as to reduce power consumption of the electronic device.

The smart PA algorithm module includes a threshold write module, a data capture module, an abnormality determining module, and a result reporting module.

The threshold write module is configured to write a voltage threshold range, a current threshold range, an impedance threshold range, an admittance threshold range, and the like of the screen sound production component (such as a piezoelectric ceramic) in a normal case.

The data capture module is configured to obtain the load voltage and the load current of the screen sound production component from the smart PA hardware circuit.

The abnormality determining module may be configured to: compare the load current obtained by the data capture module with the current threshold range in the threshold write module, and determine whether the load current of the screen sound production component is within the current threshold range. The abnormality determining module may be further configured to: compare the load voltage obtained by the data capture module with the voltage threshold range in the threshold write module, and determine whether the load voltage of the screen sound production component is within the voltage threshold range. The abnormality determining module may be further configured to: calculate the impedance or the admittance of the screen sound production component based on the feedback voltage and the feedback current obtained by the data capture module (for a specific calculation method, references may be made to the foregoing description about impedance or admittance calculation), and compare the calculated impedance with the impedance threshold range in the threshold write module to determine whether the impedance of the screen sound production component is within the impedance threshold range, or compare the calculated admittance with the admittance threshold range in the threshold write module to determine whether the admittance of the screen sound production component is within the admittance threshold range.

The result reporting module is configured to: when the load current of the screen sound production component is not within the current threshold range, or when the load voltage of the screen sound production component is not within the voltage threshold range, or when the impedance of the screen sound production component is not within the impedance threshold range, or when the admittance of the screen sound production component is not within the admittance threshold range, report an abnormality result of the screen sound production component to the audio algorithm module, so that the audio algorithm module switches the sound production component.

The following is a detailed description of the audio playback method provided in the embodiment of this application.

In some embodiments, to reduce power consumption, a single-frequency audio that is inaudible or difficult to hear by a human ear (for example, an audio at a frequency of 20 Hz, 31.25 Hz, 50 Hz, 19 KHz, 20 KHz, or 22 KHz,) is played only for a period of time after an audio playback instruction is delivered, so as to detect whether the screen sound production component is damaged, switch the sound production component, such as switching to the speaker for sound production when the screen sound production component is damaged, and then start normal audio playback.

Figure 13A:
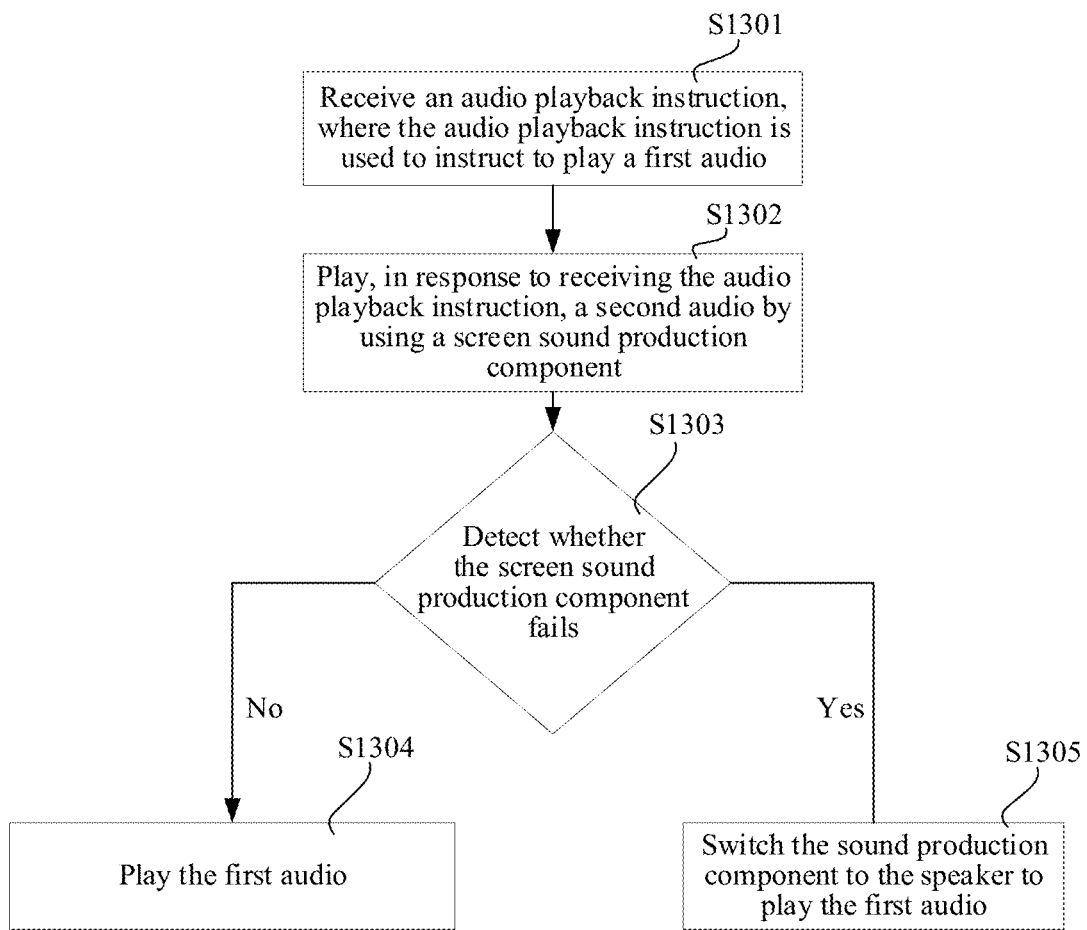
FIG. 13A is a flowchart 1 of an audio playback method according to an embodiment of this application.

For example, as shown in FIG. 13A, the audio playback method includes the following steps:

S1301. Receive an audio playback instruction. The audio playback instruction is used to instruct to play a first audio.

For example, an electronic device detects an operation of making a call by a user, and an upper-layer application (for example, a call application) sends a call instruction to a processor of the electronic device. For another example, the electronic device detects an operation of playing music by the user, and an upper-layer application (for example, a music application) delivers a music playback instruction to the processor of the electronic device. For another example, the electronic device detects an operation of playing a video file by the user, and an upper-layer application (for example, a video application) delivers a video file playback instruction to the processor of the electronic device. The foregoing call instruction, music playback instruction, and video file playback instruction may all be considered as audio playback instructions. In this case, a DSP chip in the processor of the electronic device may control a sound production component (such as a speaker or a screen sound production component) to obtain a corresponding parameter, start, and prepare for audio playback.

S1302. Play, in response to receiving the audio playback instruction, a second audio by using the screen sound production component.

For example, as shown in FIG. 12, when the DSP chip receives the audio playback instruction, in response to the audio playback instruction, an audio algorithm of the DSP chip may configure the sound production component (such as a speaker or a screen sound production component), so that the sound production component obtains a corresponding parameter, and starts sound production of the speaker or sound production of the screen sound production component.

In this case, to detect whether the screen sound production component is damaged, after the screen sound production component is enabled, the screen sound production component may be controlled to play a segment of single-frequency audio that is inaudible or difficult to hear by a human ear (that is, the second audio), for example, with an amplitude of −35 to −40 decibels (dB), and at a frequency of 20 Hz, 31.25 Hz, 50 Hz, 19 KHz, 20 KHz, or 22 KHz.

To avoid that a long playback time of the second audio affects user experience, generally, the playback time of the first audio does not exceed 1 second.

S1303. Detect whether the screen sound production component fails.

For example, in a process in which the electronic device performs S1302 and plays the second audio, the electronic device may perform the foregoing detection method shown in FIG. 8, FIG. 9, FIG. 10A, FIG. 10B, or FIG. 11 to determine whether the screen sound production component fails;
  if the screen sound production component does not fail, perform the following S1304; and
  if the screen sound production component fails, perform the following S1305.

S1304. Play the first audio.

The first audio is an audio played as instructed by the audio playback instruction. For example, if the audio playback instruction is delivered after it is detected that the user makes a call, the first audio may be a sound of the other party in a call process. For another example, if the audio playback instruction is delivered after an operation of playing music by the user is detected, the first audio may be music. For another example, if the audio playback instruction is delivered after an operation of playing a video file by the user is detected, the first audio may be an audio in the video file.

It should be understood that, when the screen sound production component (such as a piezoelectric ceramic) is normal, the screen sound production component can normally produce a sound. When dual-component sound production is set on the electronic device, dual-component sound production is kept, and the first audio is played by using the screen sound production component and the speaker. For example, the screen sound production component plays a left audio channel of the first audio, and the speaker plays a right audio channel of the first audio. Certainly, the screen sound production component may play the right channel audio of the first audio, and the speaker may play the left channel audio of the first audio. Sound channels of an audio to be played by the screen sound production component and the speaker may be configured by using an audio algorithm module, which is not specially limited in this embodiment of this application.

It should be noted that, when the screen sound production component (such as a piezoelectric ceramic) is normal, the electronic device may play the first audio only by using the screen sound production component.

S1305. Switch the sound production component to the speaker to play the first audio.

It should be understood that, when the screen sound production component (such as a piezoelectric ceramic) fails, the screen sound production component cannot normally play audio data, such as the first audio, and the screen sound production component may further have noise, which affects user experience. In this case, after receiving a detection result reported by the smart PA algorithm module, the audio algorithm module in the DSP chip configures the sound production component again, and switches the sound production component, for example, switches from the screen sound production component to the speaker for sound production, or switches from dual-component sound production to the speaker for sound production.

In this process, after receiving the detection result reported by the smart PA algorithm module, the audio algorithm of the DSP chip further reports the detection result of whether the screen sound production component fails to the application layer, so as to remind the user that the screen sound production component is damaged and needs to be replaced and repaired in time. For example, if the audio playback instruction is delivered after an operation performed by the user on a video call is detected, the electronic device may display a repair prompt box 1300 (that is, a preset prompt box) on a video call interface shown in FIG. 13B(1), for example, display prompt information such as "Friendly reminder: The screen sound production component has failed and the sound has been switched to the speaker. Please visit the service center for repair as soon as possible". For another example, if the audio playback instruction is delivered after an operation of watching a video file by the user is detected, the electronic device may display the repair prompt box 1300 on a video playback interface shown in FIG. 13B(2). For another example, if the audio playback instruction is delivered after it is detected that the user makes a call, the electronic device may display the repair prompt box 1300 on a call interface shown in FIG. 13B(3).

In addition, the electronic device may further prompt the user to change a user setting, disable a dual-sound production unit switching function, and the like. For example, the electronic device may be set to produce a sound only by the speaker.

In addition, after receiving the detection result reported by the smart PA algorithm module, the audio algorithm module of the DSP chip further reports the failure detection result of the screen sound production component to the HAL layer. The HAL layer may automatically disable the dual-component switching function (the dual-component switching function is enabled by default) when receiving the failure detection result of the screen sound production component. The smart PA control HAL in the HAL layer can control an impedance detection function in the smart PA algorithm to be disabled, and control the smart PA hardware circuit (such as the hardware circuit (smart PA0) of the screen sound production component) to be disabled by using an I2C signal, so as to reduce power consumption of the electronic device.

It should be noted that, in the audio playback method shown in FIG. 13A, failure detection of the screen sound production component is performed only when an audio playback instruction is delivered. However, in a process in which the electronic device plays an audio, the screen sound production component may also be damaged, which causes silence or noise and affects user experience.

Figure 14:
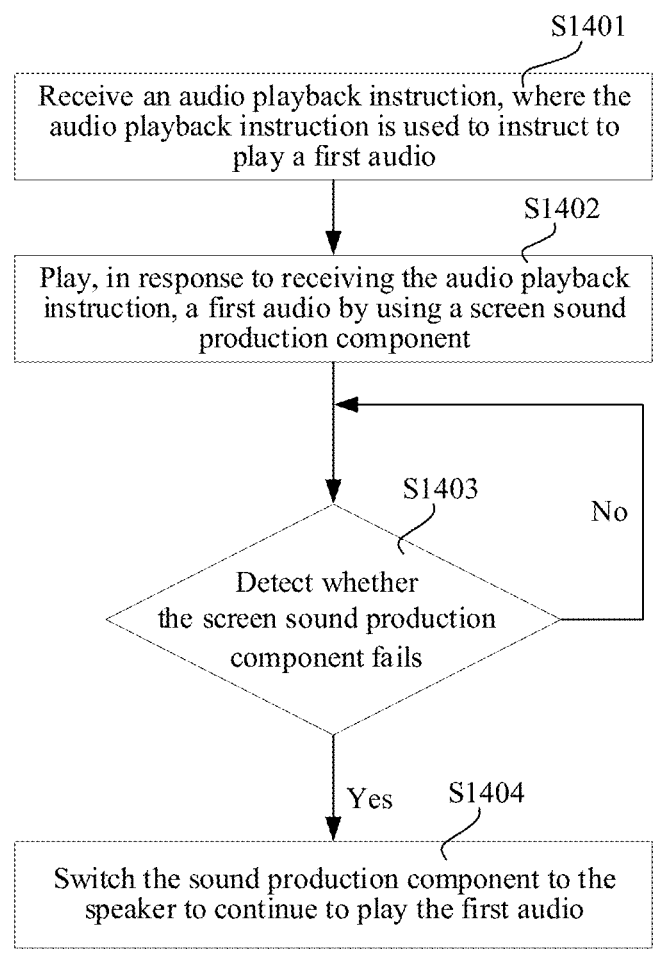
FIG. 14 is a flowchart 2 of an audio playback method according to an embodiment of this application.

Therefore, in other embodiments, the electronic device may detect in real time, in the audio playback process, whether the screen sound production component fails. As shown in FIG. 14, the audio playback method includes the following steps:

S1401. Receive an audio playback instruction. The audio playback instruction is used to instruct to play a first audio.

Refer to S1301. Details are not described herein again.

S1402. Play, in response to receiving the audio playback instruction, a first audio by using the screen sound production component.

For example, as shown in FIG. 12, when the DSP chip receives the audio playback instruction, in response to the audio playback instruction, an audio algorithm of the DSP chip may configure the sound production component (such as a speaker or a screen sound production component), so that the sound production component obtains a corresponding parameter, and starts sound production of the speaker or sound production of the screen sound production component.

In this case, the electronic device may directly play the first audio after receiving the audio playback instruction. In a process of playing the first audio, the following S1403 is performed at an interval of a preset period to detect whether the screen sound production component fails, so as to detect, in a timely manner, a failure of the screen sound production component in a process of playing a normal audio, thereby reducing a possibility of silence or noise, and improving user experience.

S1403. Detect whether the screen sound production component fails.

For example, in a process in which the electronic device performs S1402 and plays the first audio, the electronic device may perform the foregoing detection method shown in FIG. 8, FIG. 9, FIG. 10A, FIG. 10B, or FIG. 11 to determine whether the screen sound production component fails;

When the screen sound production component does not fail, S1403 is repeatedly performed at an interval of the preset period (for example, is or 2 s).

If the screen sound production component fails, the following S1404 is performed.

S1404. Switch the sound production component to the speaker to continue to play the first audio.

Refer to S1305. Details are not described herein again.

It should be noted that, in the audio playback method shown in FIG. 14, in an entire audio playback process, real-time detection is performed on whether the screen sound production component fails, thereby increasing power consumption of the electronic device.

Figure 15:
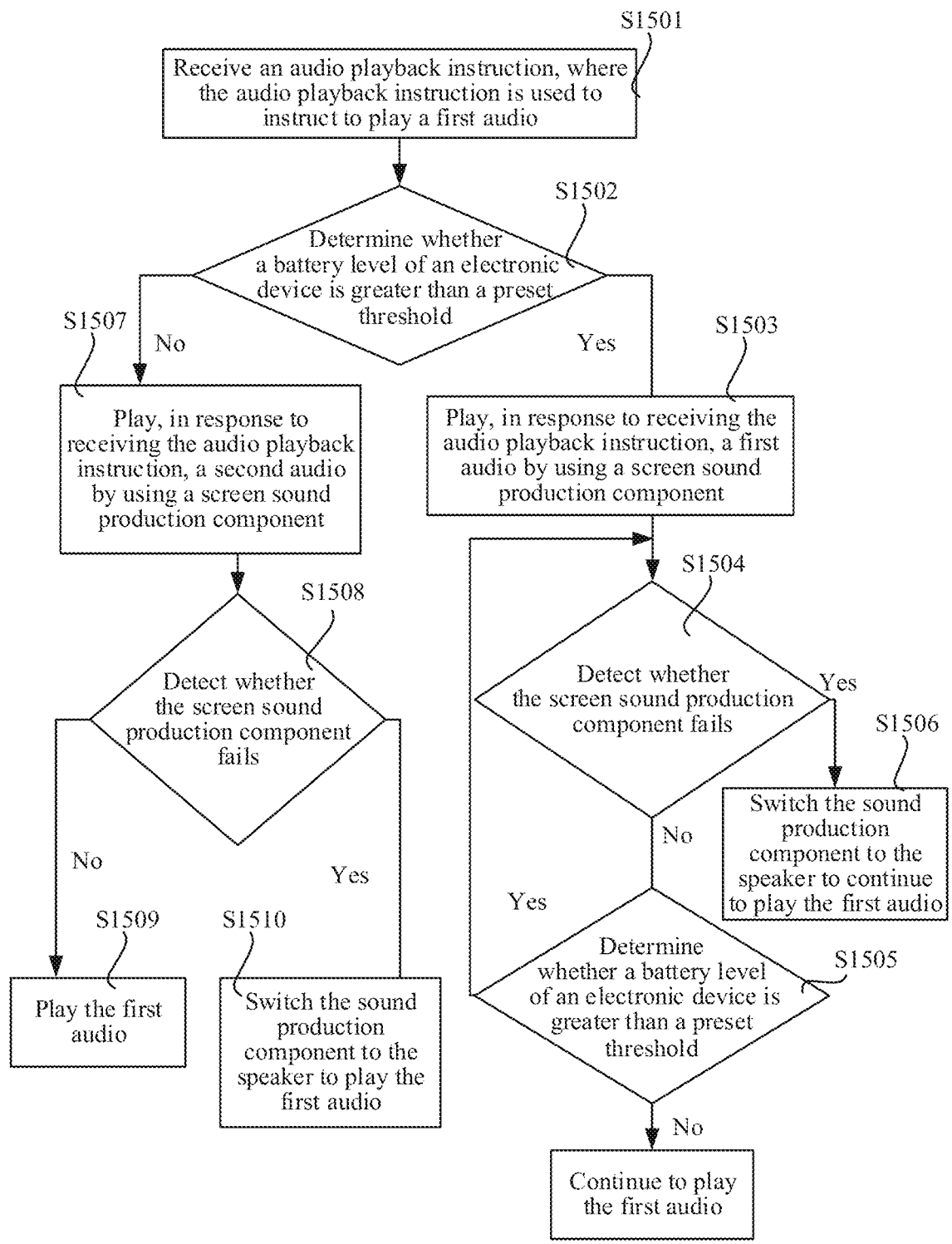
FIG. 15 is a flowchart 3 of an audio playback method according to an embodiment of this application.

To reduce power consumption of the electronic device, an embodiment of this application further provides another audio playback method. As shown in FIG. 15, the audio playback method includes the following steps:

S1501. Receive an audio playback instruction. The audio playback instruction is used to instruct to play a first audio.

Refer to S1301. Details are not described herein again.

S1502. Determine whether a battery level of the electronic device is greater than a preset threshold.

For example, the preset threshold may be 50%, 40%, or 30% of a battery capacity, and may be specifically set based on an actual situation.

After the audio playback instruction is received, if the battery level of the electronic device is greater than the preset threshold, the following S1503-S1506 are performed, and the first audio is played by using a screen sound production component.

After the audio playback instruction is received, if the battery level of the electronic device is less than or equal to the preset threshold, the following S1507-S1510 are performed.

S1503. Start the screen sound production component to play the first audio in response to receiving the audio playback instruction.

Refer to S1402. Details are not described herein again.

S1504. Detect whether the screen sound production component fails.

For example, in a process in which the electronic device performs S1503 and plays the first audio, the electronic device may perform the foregoing detection method shown in FIG. 8, FIG. 9, FIG. 10A, FIG. 10B, or FIG. 11 to determine whether the screen sound production component fails;

When the screen sound production component does not fail, the following S1505 is performed, to determine whether the battery level of the electronic device is greater than the preset threshold.

If the screen sound production component fails, the following S1406 is performed.

S1505. Determine whether a battery level of the electronic device is greater than a preset threshold.

For example, if the battery level of the electronic device is greater than the preset threshold, S1504 is repeatedly performed at an interval of a preset period (for example, 1 s or 2 s). If the battery level of the electronic device is less than or equal to the preset threshold, S1504 is not performed.

S1506. Switch the sound production component to the speaker to continue to play the first audio.

Refer to S1305. Details are not described herein again.

S1507. Play, in response to receiving the audio playback instruction, a second audio by using the screen sound production component.

Refer to S1302. Details are not described herein again.

S1508. Detect whether the screen sound production component fails.

Refer to S1303. Details are not described herein again.

S1509. Play the first audio.

Refer to S1304. Details are not described herein again.

S1510. Switch the sound production component to the speaker to play the first audio.

Refer to S1305. Details are not described herein again.

In conclusion, in the audio playback method shown in FIG. 15, after receiving the audio playback instruction, the electronic device first determines whether the battery level of the electronic device exceeds the preset threshold. When the battery level of the electronic device exceeds the preset threshold, it indicates that the current battery level of the electronic device is relatively high. The audio playback method shown in FIG. 14 may be used to play the first audio. When the battery level of the electronic device is less than the preset threshold, S1504 is stopped, to stop detecting whether the screen sound production component fails. When the preset threshold is not exceeded, it indicates that current battery level of the electronic device is relatively small. To reduce power consumption, the audio playback method shown in FIG. 13A may be used to play the first audio.

In this way, in the audio playback method provided in this embodiment of this application, in the audio playback method, before or in an audio playback process, it is detected whether a screen sound production component fails (such as breaking or electrode falling off), and the sound production component is switched, for example, to a speaker when the screen sound production component fails, thereby avoiding a noise or silence problem that occurs when the screen sound production component fails, thereby improving user experience.

Figure 16:
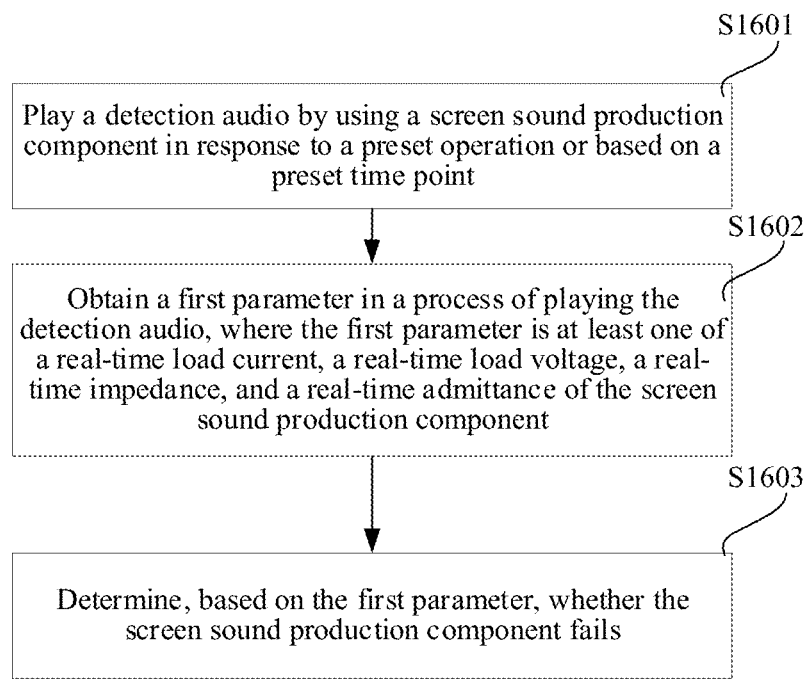
FIG. 16 is a flowchart of a failure detection method for a screen sound production component according to an embodiment of this application.

An embodiment of this application further provides a failure detection method for a screen sound production component. As shown in FIG. 16, the failure detection method for a screen sound production component includes:

S1601. Play a detection audio by using the screen sound production component in response to a preset operation or based on a preset time point.

The preset operation or the preset time point is used to trigger the electronic device to detect whether the screen sound production component fails.

For example, the preset operation may be a user use operation such as an operation of making a call by the user, an operation of playing music by the user, or an operation of playing a video file by the user. The preset operation may alternatively be an operation of detecting, by the user, whether the screen sound production component fails. For example, a start button for detecting whether the screen sound production component fails may be set, and the user may tap the start button, so that the electronic device plays a detection audio by using the screen sound production component, so as to detect whether the screen sound production component fails. In this case, the preset operation may be a tap operation performed by the user on the start button for detecting whether the screen sound production component fails. Therefore, specific content of the user operation is not specially limited in this embodiment of this application.

Figure 17A:
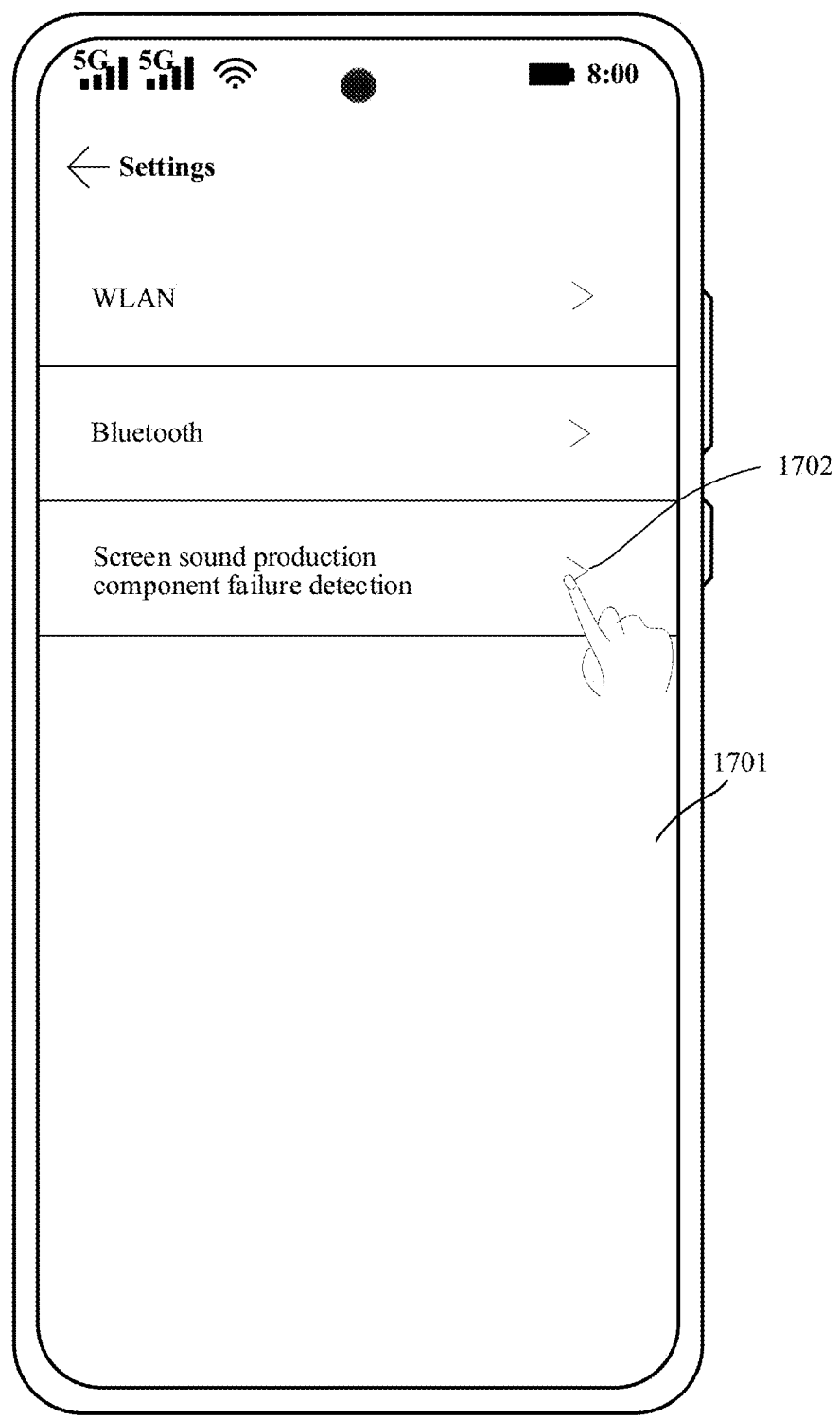
FIG. 17A and FIG. 17B are a scenario diagram 1 of a failure detection method for a screen sound production component according to an embodiment of this application.
Figure 17B:
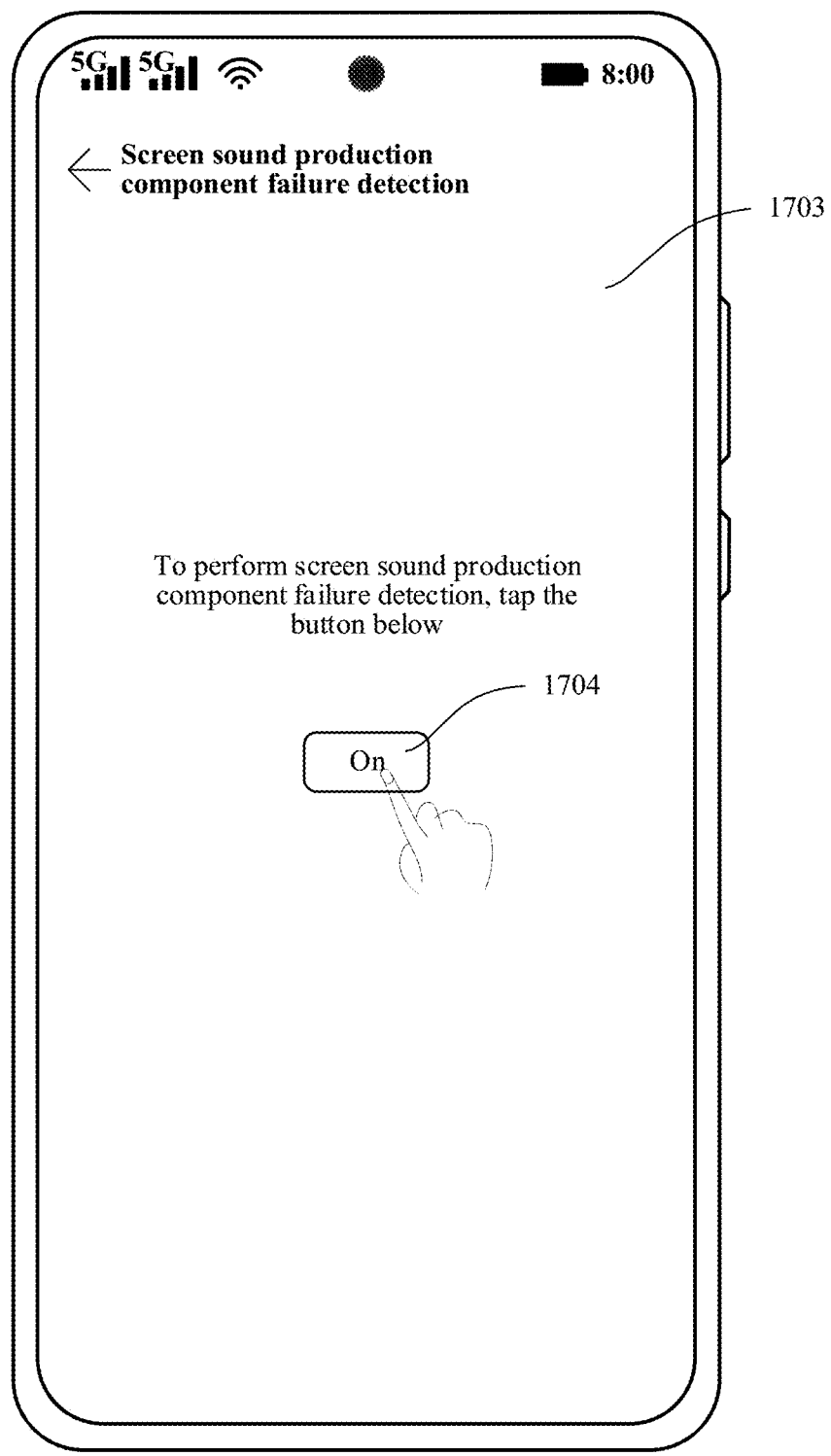
Figure 18A:
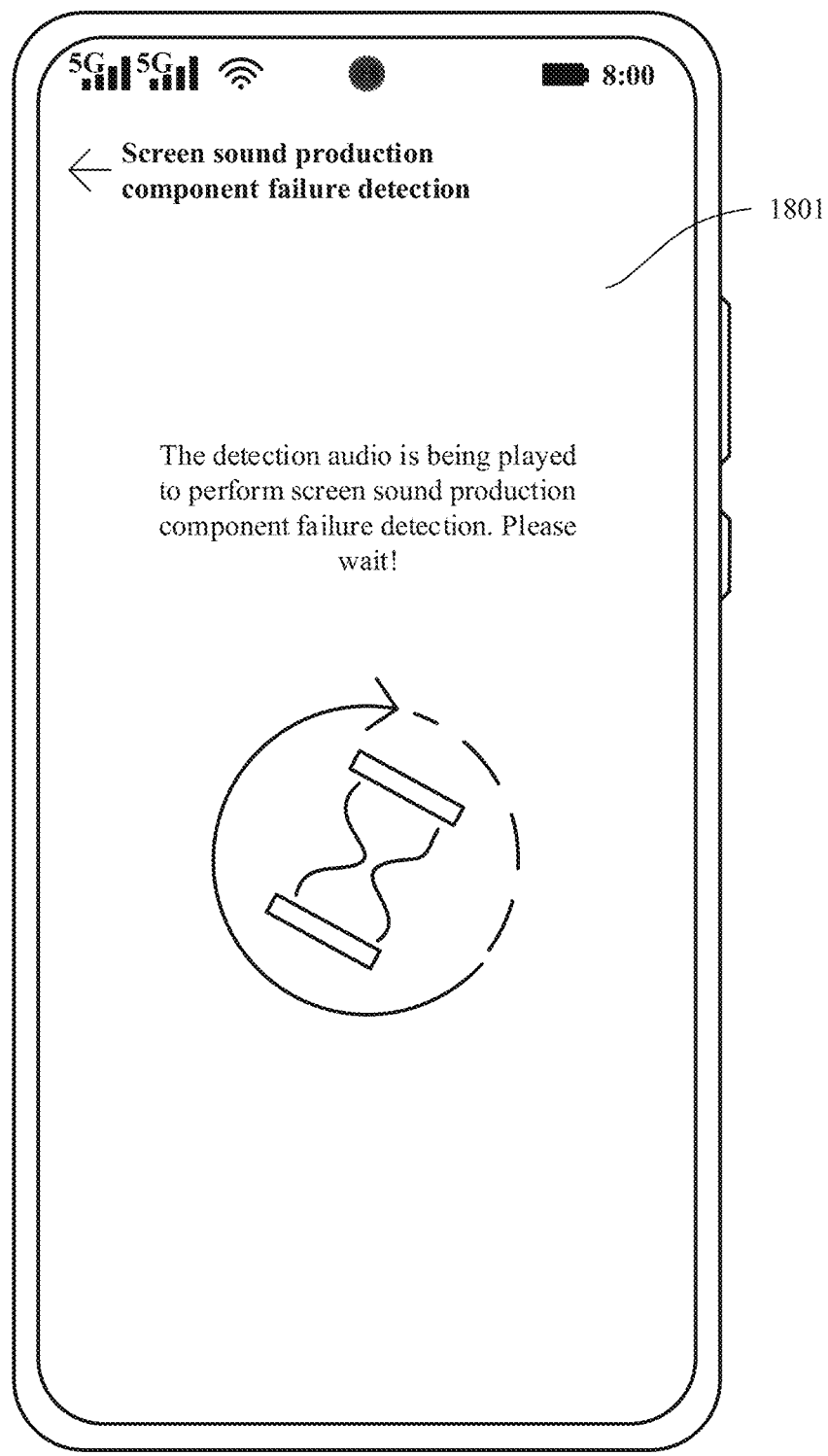
FIG. 18A and FIG. 18B are a scenario diagram 2 of a failure detection method for a screen sound production component according to an embodiment of this application.

For example, as shown in FIG. 17A, a detection option 1702 of "screen sound production component failure detection" is set on a setting interface 1702 in the electronic device. In response to a tap operation performed by the user on the detection option 1702, the electronic device may display a screen sound production component failure detection interface 1703 shown in FIG. 17B. The electronic device may display a detection interface 1801 shown in FIG. 18A in response to a tap operation performed by the user on an enable button 1704 in the screen sound production component failure detection interface 1703. In this case, the electronic device plays the detection audio by using the screen sound production component, so that the electronic device performs failure detection on the screen sound production component.

The preset time point may be a preset time point for performing failure detection on the screen sound production component by the electronic device, may be a time point that is set by the electronic device in advance of factory delivery, or may be set by the user based on an actual requirement. This is not specially limited in this embodiment of this application.

The detection audio may be an audio specially used to detect whether the screen sound production component fails, and the detection audio may be an audible (that is, audible to a human ear) audio, for example, an audio used to prompt the user that screen sound production component failure detection is performed; or may be silent (that is, inaudible to the human ear) audio, such as a single-frequency audio inaudible to the human ear. Certainly, the detection audio may alternatively be a normal audio signal audible to the human ear, such as voice in a call, audio in a normally played music or video file.

S1602. Obtain a first parameter in a process of playing the detection audio. The first parameter is at least one of a real-time load current, a real-time load voltage, a real-time impedance, and a real-time admittance of the screen sound production component.

It should be understood that, S1602 may be corresponding to a combination of S801, S901, S1001, and S1002, and a combination of S1001 and S1002a. Details are not described herein again.

S1603. Determine, based on the first parameter, whether the screen sound production component fails.

It should be understood that S1603 may be corresponding to a combination of S802 and S803, a combination of S902 and S903, a combination of S1003 and S1004, and a combination of S1003a and S1004. Details are not described herein again.

Figure 18B:
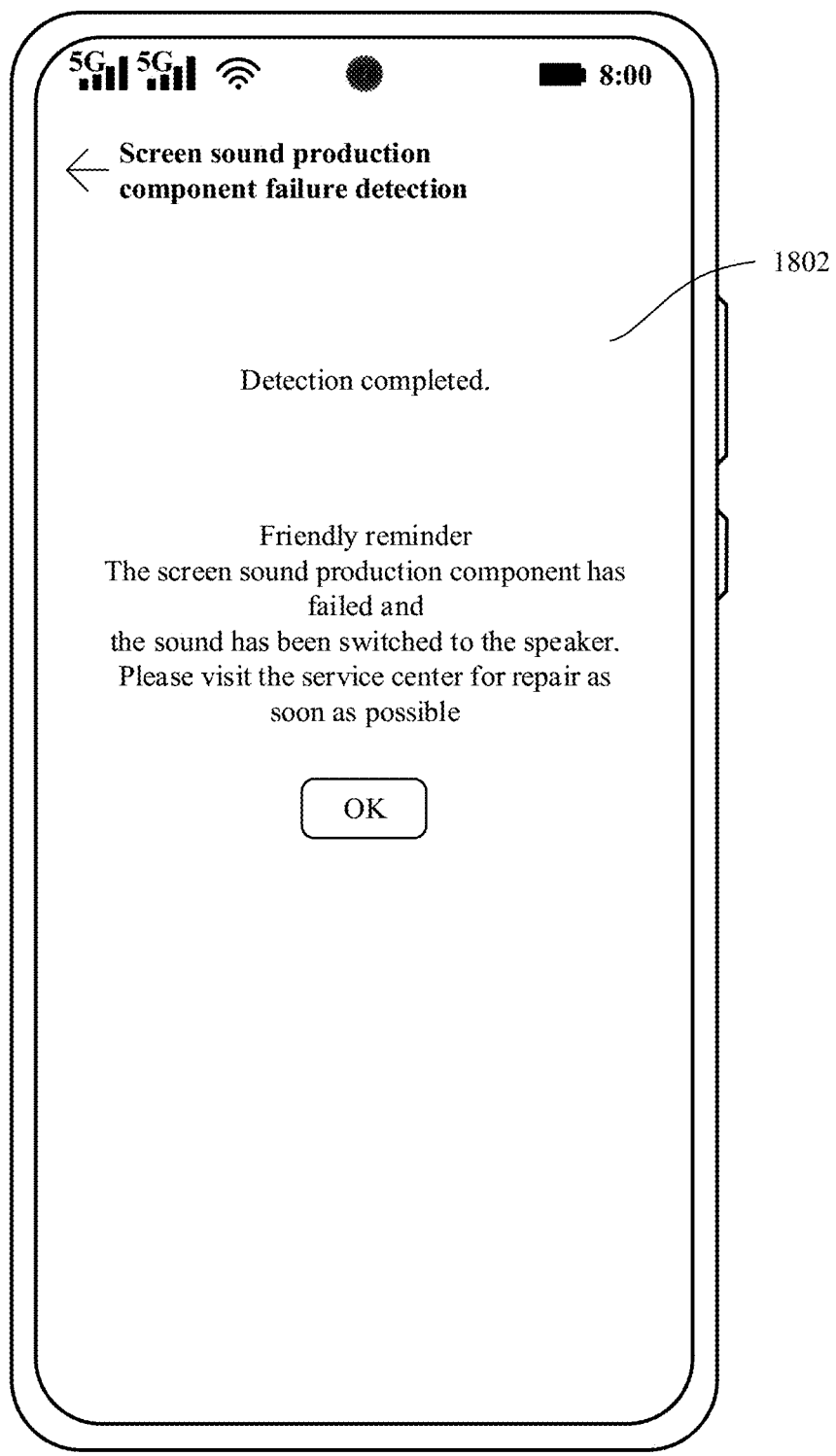

Certainly, the electronic device may further display a detection completion prompt interface after screen sound production component failure detection is completed. When it is determined that the screen sound production component failure fails, for example, as shown in FIG. 18B, prompt information such as "Friendly reminder: The screen sound production component has failed and the sound has been switched to the speaker. Please visit the service center for repair as soon as possible" may be displayed on a detection completion prompt interface 1802.

Based on the failure detection method for a screen sound production component, the electronic device may detect, based on the preset operation or the preset time point, whether the screen sound production component fails, so as to periodically detect the screen sound production component, so as to notify the user of a failure of the screen sound production component in time, and prompt the user to repair or modify a default configuration of the electronic device, so as to improve reliability of the electronic device.

Figure 19:
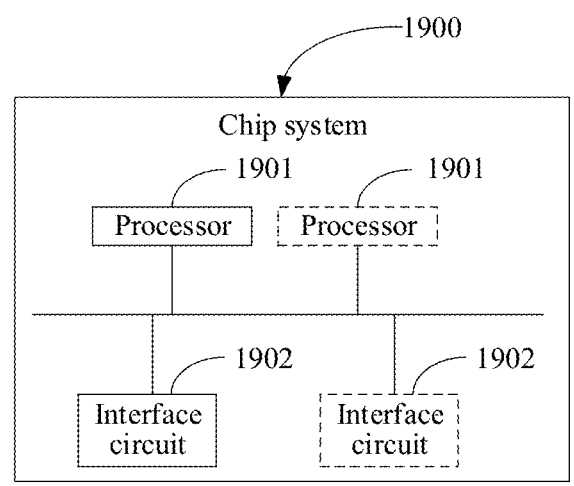
FIG. 19 is a schematic diagram of a structure of a chip system according to an embodiment of this application.

An embodiment of this application provides a chip system. As shown in FIG. 19, the chip system includes at least one processor 1901 and at least one interface circuit 1902. The processor 1901 and the interface circuit 1902 may be connected through a line. For example, the interface circuit 1902 may be configured to receive a signal from another apparatus (such as a memory of an electronic device). For another example, the interface circuit 1902 may be configured to send a signal to another apparatus (such as the processor 1901).

For example, the interface circuit 1902 may read instructions stored in the memory of the electronic device, and send the instructions to the processor 1901. The instructions, when executed by the processor 1901, can cause the electronic device (the electronic device shown in FIG. 3) to perform the functions or steps performed by the electronic device in the above embodiments.

Certainly, the chip system may further include other discrete devices. This is not specifically limited in this embodiment of this application.

Another embodiment of this application provides a computer storage medium. The computer storage medium includes computer instructions. When the computer instructions are run on an electronic device, the electronic device is enabled to perform the functions or steps performed by the electronic device in the foregoing method embodiments.

Another embodiment of this application provides a computer program product. When the computer program product is run on a computer, the computer is enabled to perform the functions or steps performed by the electronic device in the foregoing method embodiments.

Based on the foregoing descriptions of the implementations, a person skilled in the art may clearly understand that, for the purpose of convenient and brief description, division of the foregoing functional modules is merely used as an example for description. In actual application, the foregoing functions may be allocated to different functional modules for implementation according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product, for example, a program. The software product is stored in a program product, such as a computer-readable storage medium, and includes several instructions for instructing a device (which may be a single-chip microcomputer, a chip, or the like) or a processor (processor) to perform all or some of the steps of the methods described in the embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the audio playback method described in the foregoing method embodiment.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An audio playback method, applied to an electronic device, wherein the electronic device comprises a screen sound production component and a speaker; and
   the method comprises:
   receiving an audio playback instruction; wherein the audio playback instruction is used to instruct the electronic device to play a first audio;
   playing, in response to receiving the audio playback instruction, a detection audio by using the screen sound production component;
   obtaining a first parameter in a process of playing the detection audio; wherein the first parameter is at least one of a real-time load current, a real-time load voltage, a real-time impedance, and a real-time admittance of the screen sound production component;
   determining, based on the first parameter, whether the screen sound production component fails; and
   when the screen sound production component fails, switching the sound production component to the speaker, and playing the first audio by using the speaker; or
   when the screen sound production component does not fail, playing the first audio by using the screen sound production component, or playing the first audio simultaneously by using the screen sound production component and the speaker.

2. The method according to claim 1, wherein the detection audio is a second audio; the second audio is an audio signal different from the first audio; and
   the playing, in response to receiving the audio playback instruction, a detection audio by using the screen sound production component comprises:
   playing the second audio by using the screen sound production component before playing the first audio in response to receiving the audio playback instruction.

3. The method according to claim 1, wherein the detection audio is the first audio; and
   the obtaining a first parameter in a process of playing the detection audio comprises:
   obtaining the first parameter according to a preset period in the process of playing the detection audio.

4. The method according to claim 1, wherein if a battery level of the electronic device is greater than a preset threshold, the detection audio is the first audio; and
   the obtaining a first parameter in a process of playing the detection audio comprises:
   obtaining the first parameter according to a preset period in the process of playing the detection audio;
   or
   if a battery level of the electronic device is less than or equal to a preset threshold, the detection audio is a second audio; the second audio is an audio signal different from the first audio; and
   the playing, in response to receiving the audio playback instruction, a detection audio by using the screen sound production component comprises:
   playing the second audio by using the screen sound production component before playing the first audio in response to receiving the audio playback instruction.

5. The method according to claim 2, wherein the second audio comprises a human-ear inaudible single-frequency audio signal or a human-ear audible audio signal different from the first audio.

6. The method according to claim 1, wherein the audio playback instruction comprises a call instruction, a music playback instruction, or a video file playback instruction.

7. The method according to claim 1, wherein the first parameter comprises the real-time load current of the screen sound production component;

the determining, based on the first parameter, whether the screen sound production component fails comprises:
if the real-time load current of the screen sound production component is greater than a maximum value of a current threshold range, or the real-time load current of the screen sound production component is less than a minimum value of the current threshold range, determining that the screen sound production component fails; and the current threshold range is: a current range corresponding to a first frequency when the screen sound production component does not fail; and the first frequency is a frequency of a center frequency point of the detection audio.

8. The method according to claim 1, wherein the first parameter comprises the real-time load voltage of the screen sound production component;

the determining, based on the first parameter, whether the screen sound production component fails comprises:
if the real-time load voltage of the screen sound production component is greater than a maximum value of a voltage threshold range, or the real-time load voltage of the screen sound production component is less than a minimum value of the voltage threshold range, determining that the screen sound production component fails; and the voltage threshold range is: a voltage range corresponding to a first frequency when the screen sound production component does not fail; and the first frequency is a frequency of a center frequency point of the detection audio.

9. The method according to claim 1, wherein the first parameter comprises the real-time impedance of the screen sound production component; the real-time impedance of the screen sound production component is determined by the real-time load voltage and the real-time load current of the screen sound production component;

the determining, based on the first parameter, whether the screen sound production component fails comprises:
if the real-time impedance of the screen sound production component is greater than a maximum value of an impedance threshold range, or the real-time impedance of the screen sound production component is less than a minimum value of the impedance threshold range, determining that the screen sound production component fails; and the impedance threshold range is: an impedance range corresponding to a first frequency when the screen sound production component does not fail; and the first frequency is a frequency of a center frequency point of the detection audio.

10. The method according to claim 1, wherein the first parameter comprises: the real-time admittance of the screen sound production component; the real-time admittance of the screen sound production component is determined by the real-time load voltage and the real-time load current of the screen sound production component;

the determining, based on the first parameter, whether the screen sound production component fails comprises:
if the real-time admittance of the screen sound production component is greater than a maximum value of an admittance threshold range, or the real-time admittance of the screen sound production component is less than a minimum value of the admittance threshold range, determining that the screen sound production component fails; and the admittance threshold range is: an admittance range corresponding to a first frequency when the screen sound production component does not fail; and the first frequency is a frequency of a center frequency point of the detection audio.

11. The method according to claim 7, wherein the real-time load current of the screen sound production component is: an average value of M feedback currents obtained through detection when the screen sound production component plays N frames of the detection audio; and N and M are both positive integers greater than 1.

12. The method according to claim 8, wherein the real-time load voltage of the screen sound production component is: an average value of M feedback voltages obtained through detection when the screen sound production component plays N frames of the detection audio; and N and M are both positive integers greater than 1.

13. The method according to claim 7, wherein the real-time load voltage of the screen sound production component or the real-time load current of the screen sound production component is obtained by a smart power amplifier module.

14. A failure detection method for a screen sound production component, applied to an electronic device, wherein the electronic device comprises a screen sound production component, and the method comprises:

playing a detection audio by using the screen sound production component in response to a preset operation or based on a preset time point;
obtaining a first parameter in a process of playing the detection audio; wherein the first parameter is at least one of a real-time load current, a real-time load voltage, a real-time impedance, and a real-time admittance of the screen sound production component; and
determining, based on the first parameter, whether the screen sound production component fails.

15. The method according to claim 14, wherein the first parameter comprises the real-time load current of the screen sound production component;

the determining, based on the first parameter, whether the screen sound production component fails comprises:
if the real-time load current of the screen sound production component is greater than a maximum value of a current threshold range, or the real-time load current of the screen sound production component is less than a minimum value of the current threshold range, determining that the screen sound production component fails; and the current threshold range is: a current range corresponding to a first frequency when the screen sound production component does not fail; and the first frequency is a frequency of a center frequency point of the detection audio.

16. The method according to claim 14, wherein the first parameter comprises the real-time load voltage of the screen sound production component;

the determining, based on the first parameter, whether the screen sound production component fails comprises:
if the real-time load voltage of the screen sound production component is greater than a maximum value of a voltage threshold range, or the real-time load voltage of the screen sound production component is less than a minimum value of the voltage threshold range, determining that the screen sound production component fails; and the voltage threshold range is: a voltage range corresponding to a first frequency when the screen sound production component does not fail; and the first frequency is a frequency of a center frequency point of the detection audio.

17. The method according to claim 14, wherein the first parameter comprises the real-time impedance of the screen sound production component; the real-time impedance of the screen sound production component is determined by the real-time load voltage and the real-time load current of the screen sound production component;

the determining, based on the first parameter, whether the screen sound production component fails comprises:

if the real-time impedance of the screen sound production component is greater than a maximum value of an impedance threshold range, or the real-time impedance of the screen sound production component is less than a minimum value of the impedance threshold range, determining that the screen sound production component fails; and the impedance threshold range is: an impedance range corresponding to a first frequency when the screen sound production component does not fail; and the first frequency is a frequency of a center frequency point of the detection audio.

18. The method according to claim 14, wherein the first parameter comprises: the real-time admittance of the screen sound production component; the real-time admittance of the screen sound production component is determined by the real-time load voltage and the real-time load current of the screen sound production component;

the determining, based on the first parameter, whether the screen sound production component fails comprises:

if the real-time admittance of the screen sound production component is greater than a maximum value of an admittance threshold range, or the real-time admittance of the screen sound production component is less than a minimum value of the admittance threshold range, determining that the screen sound production component fails; and the admittance threshold range is: an admittance range corresponding to a first frequency when the screen sound production component does not fail; and the first frequency is a frequency of a center frequency point of the detection audio.

19. The method according to claim 15, wherein the real-time load current of the screen sound production component is: an average value of M feedback currents obtained through detection when the screen sound production component plays N frames of the detection audio; and N and M are both positive integers greater than 1.

20. An electronic device, comprising:

a screen sound production component and a speaker configured to play a sound signal;

one or more processors;

a communication module to communicate with an external device; and a memory storing instructions, which when executed by the one or more processors, cause the electronic device to perform a method, the method comprising:

receiving an audio playback instruction; wherein the audio playback instruction is used to instruct the electronic device to play a first audio;

playing, in response to receiving the audio playback instruction, a detection audio by using the screen sound production component;

obtaining a first parameter in a process of playing the detection audio; wherein the first parameter is at least one of a real-time load current, a real-time load voltage, a real-time impedance, and a real-time admittance of the screen sound production component;

determining, based on the first parameter, whether the screen sound production component fails; and when the screen sound production component fails, switching the sound production component to the speaker, and playing the first audio by using the speaker; or when the screen sound production component does not fail, playing the first audio by using the screen sound production component, or playing the first audio simultaneously by using the screen sound production component and the speaker.

* * * * *